(12) United States Patent
Sall

(10) Patent No.: US 11,586,675 B1
(45) Date of Patent: Feb. 21, 2023

(54) INTERACTIVE GRAPHICAL USER INTERFACE FOR SPECIFICATION RATE SETTINGS AND PREDICTIONS

(71) Applicant: JMP Statistical Discovery LLC, Cary, NC (US)

(72) Inventor: John Sall, Cary, NC (US)

(73) Assignee: JMP Statistical Discovery LLC, Cary, NC (US)

( * ) Notice: Subject to any disclaimer, the term of this patent is extended or adjusted under 35 U.S.C. 154(b) by 0 days.

(21) Appl. No.: 17/860,655

(22) Filed: Jul. 8, 2022

Related U.S. Application Data

(60) Provisional application No. 63/321,810, filed on Mar. 21, 2022, provisional application No. 63/229,033, filed on Aug. 3, 2021.

(51) Int. Cl.
*G06F 16/901* (2019.01)
*G06F 40/18* (2020.01)
*G06F 3/04847* (2022.01)

(52) U.S. Cl.
CPC ...... *G06F 16/9024* (2019.01); *G06F 3/04847* (2013.01); *G06F 40/18* (2020.01)

(58) Field of Classification Search
None
See application file for complete search history.

(56) References Cited

U.S. PATENT DOCUMENTS

| | | | | |
|---|---|---|---|---|
| 9,378,197 | B1 * | 6/2016 | Ghanem | G06F 40/18 |
| 10,996,662 | B2 * | 5/2021 | Imanari | G05B 23/0218 |
| 11,328,106 | B2 * | 5/2022 | Lekivetz | G06F 30/27 |
| 2003/0061212 | A1 * | 3/2003 | Smith | G06Q 10/06 |
| 2009/0112532 | A1 * | 4/2009 | Foslien | G06F 17/18 703/2 |
| 2013/0218909 | A1 * | 8/2013 | Chu | G06F 16/11 707/752 |
| 2020/0233542 | A1 * | 7/2020 | Breedvelt-Schouten | G06F 3/0484 |

(Continued)

OTHER PUBLICATIONS

SAS simulation studio 15.1 Users Guide, Nov. 2018, SAS Institute Inc (Year: 2018).*

(Continued)

*Primary Examiner* — Howard Cortes
(74) *Attorney, Agent, or Firm* — Coats & Bennett, PLLC

(57) ABSTRACT

A computing system obtains computer model(s) configured to predict response(s) based on variable(s). The system obtains a specification defining an allowed response set for the response(s) and receives an initial setting for bound(s). The system generates an initial design space for the variable(s) defined by the initial setting. The system displays in a graphical user interface (GUI) an initial representation of a specification rate. The specification rate indicates a portion of the initial design space predicted to generate a response within the allowed response set defined by the specification. The system receives an updated setting. The system generates an updated design space for the variable(s) defined by the updated setting. The system displays in the GUI an updated representation of an updated specification rate. The updated specification rate indicates a portion of the updated design space predicted to generate a response within the allowed response set defined by the specification.

30 Claims, 16 Drawing Sheets
(14 of 16 Drawing Sheet(s) Filed in Color)

(56) References Cited

U.S. PATENT DOCUMENTS

2021/0216593 A1* 7/2021 Chen .................. G06F 16/9017
2021/0241866 A1* 8/2021 Bhattacharya ......... G16H 40/20

OTHER PUBLICATIONS

Yu, L. et al., "Understanding Pharmaceutical Quality by Design", The American Association of Pharmaceutical Scientists Journal, vol. 16 No. 4, Jul. 1, 2018, pp. 771-783, AAPS.

Sartorius Stedim Data Analytics, "User Guide to MODDE", Version 12, Jun. 21, 2017, pp. 1-394, Startorius Stedim.

Bioharm International, "Evaluating Design Margin, Edge of Failure, and Process Capability", Analytical Best Practices, Sep. 1, 2014, pp. 1-5, BioPharm Internaitonal.

International Conference on Harmonisation Expert Working Group, "ICH Harmonised Tripartite Guideline: Pharmaceutical Development Q8(R2)", Step 4 Version, Aug. 1, 2009, pp. 1-28, ICH.

S-MATRIX, "Fusion Pro: Design of Experiments Software", S-Matric QbD Software Solutions, Jan. 1, 2015, pp. 1-7, S-Matrix Corporation.

S-MATRIX, "S-Matrix Corporation Patents", Jan. 1, 2020, pp. 1-2, retrieved on Aug. 3, 2021, retrieved from internet: https://smatrix.com/patents.html.

Sartorius, "Umertrics Suite Blog: Why DOE Is Essential in the (Bio)Pharma Industry", Oct. 14, 2020, pp. 1-11, retrieved on Aug. 3, 2021, retrieved from internet: https://blog.umetrics.com/topic/design-of-experiments-doe.

* cited by examiner

| | toughness | stretchiness | weight | thickness | SILICA | SILANE | SULFUR |
|---|---|---|---|---|---|---|---|
| 1 | 102 | 900 | 470 | 67.5 | 0.7 | 40 | 2.8 |
| 2 | 120 | 860 | 410 | 65 | 1.7 | 40 | 1.8 |
| 3 | 117 | 800 | 570 | 77.5 | 0.7 | 60 | 1.8 |
| 4 | 198 | 2294 | 240 | 74.5 | 1.7 | 60 | 2.8 |
| 5 | 103 | 490 | 640 | 62.5 | 0.7 | 40 | 1.8 |
| 6 | 132 | 1289 | 270 | 67 | 1.7 | 40 | 2.8 |
| 7 | 132 | 1270 | 410 | 78 | 0.7 | 60 | 2.8 |
| 8 | 139 | 1090 | 380 | 70 | 1.7 | 60 | 1.8 |
| 9 | 102 | 770 | 590 | 76 | 0.3835 | 50 | 2.3 |
| 10 | 154 | 1690 | 260 | 70 | 2.0165 | 50 | 2.3 |
| 11 | 96 | 700 | 520 | 63 | 1.2 | 33.67 | 2.3 |
| 12 | 163 | 1540 | 380 | 75 | 1.2 | 66.33 | 2.3 |
| 13 | 116 | 2184 | 520 | 65 | 1.2 | 50 | 1.4835 |
| 14 | 153 | 1784 | 290 | 71 | 1.2 | 50 | 3.1165 |
| 15 | 133 | 1300 | 380 | 70 | 1.2 | 50 | 2.3 |
| 16 | 133 | 1300 | 380 | 68.5 | 1.2 | 50 | 2.3 |
| 17 | 140 | 1145 | 430 | 68 | 1.2 | 50 | 2.3 |
| 18 | 142 | 1090 | 430 | 68 | 1.2 | 50 | 2.3 |
| 19 | 145 | 1260 | 390 | 69 | 1.2 | 50 | 2.3 |
| 20 | 142 | 1344 | 390 | 70 | 1.2 | 50 | 2.3 |

FIG. 3

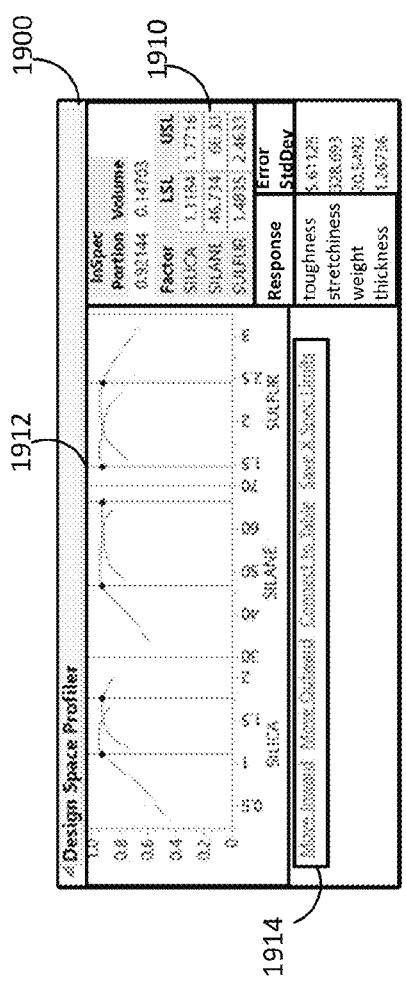
FIG. 7A
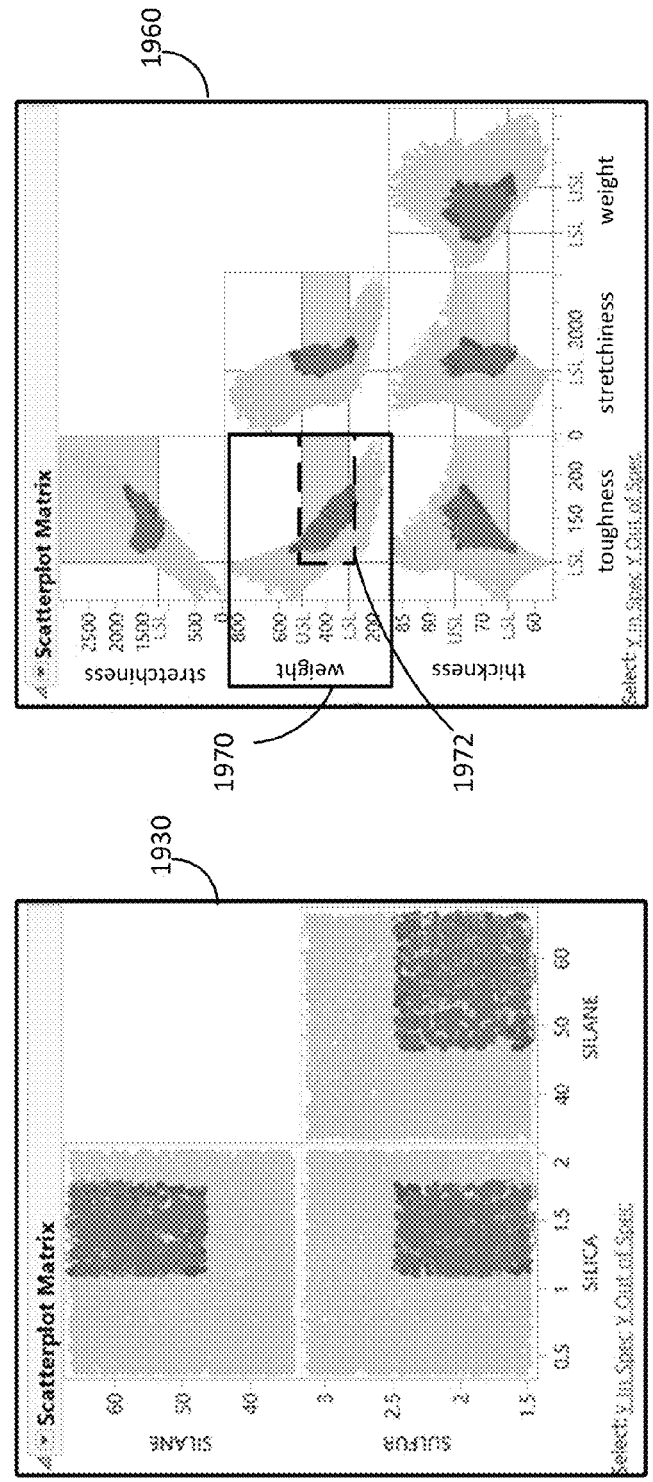
FIG. 7C
FIG. 7B

| | SILICA | SILANE | SULFUR | toughness |
|---|---|---|---|---|
| 1 | 1.7063449433 | 52.72779651 | 3.050412124 | 186.51804028 |
| 2 | 1.7954746239 | 41.207450575 | 2.178918065 | 128.63542959 |
| 3 | 1.9916958403 | 57.175243741 | 2.470350690908 | 187.35309704 |
| 4 | 1.3621444357 | 38.218025269 | 2.1215552596 | 114.01777872 |

FIG. 8

INTERACTIVE GRAPHICAL USER INTERFACE FOR SPECIFICATION RATE SETTINGS AND PREDICTIONS

CROSS-REFERENCE TO RELATED APPLICATIONS

This application claims the benefit of, and priority based on, 35 U.S.C. § 119 to U.S. Provisional Application No. 63/229,033, filed Aug. 3, 2021, and to U.S. Provisional Application No. 63/321,810, filed Mar. 21, 2022, the disclosures of each of which are incorporated herein by reference in their entirety.

BACKGROUND

Manufacturers and regulatory authorities can set standards or specifications for the outcome of a process. A specification, for example, can indicate that if a product exceeds a particular size or weight, the product cannot be used in certain environments or scenarios. A specification rate can be used to express how many manufactured products satisfy, or are predicted to satisfy, a specification or set of specifications. For example, an in-specification rate defines a portion of products that will satisfy specification criteria or an out-of-specification rate defines a portion of products that will not satisfy specification criteria.

SUMMARY

In an example embodiment, a computer-program product tangibly embodied in a non-transitory machine-readable storage medium is provided. The computer-program product includes instructions to cause a computing system to obtain at least one computing model configured to predict one or more output responses based on one or more input variables. The computer-program product includes instructions to cause a computing system to obtain a specification defining an allowed response set for the one or more output responses. The computer-program product includes instructions to cause a computing system to receive an initial setting for one or more bounds. The initial setting defines one or more sets. Each set of the one or more sets comprises one or more candidate options for a given input variable of the one or more input variables. The computer-program product includes instructions to cause a computing system to generate an initial design space for the one or more input variables defined by the initial setting. The computer-program product includes instructions to cause a computing system to display in a graphical user interface an initial graphical representation of a generated specification rate. The generated specification rate indicates a portion of the initial design space predicted, according to the at least one computing model, to generate a response within the allowed response set defined by the specification. The computer-program product includes instructions to cause a computing system to receive an updated setting based on a user indication to change a set bound of the one or more bounds in the graphical user interface such that a given set of the one or more sets comprises more or fewer candidate options than according to the initial setting. The computer-program product includes instructions to cause a computing system to generate an updated design space for the one or more input variables defined by the updated setting. The computer-program product includes instructions to cause a computing system to display in the graphical user interface an updated graphical representation of an updated specification rate. The updated specification rate indicates a portion of the updated design space predicted, according to the at least one computing model, to generate a response within the allowed response set defined by the specification.

In another example embodiment, a computing device is provided. The computing device includes, but is not limited to, a processor and memory. The memory contains instructions that when executed by the processor control the computing device to display in the graphical user interface an updated graphical representation of an updated specification rate.

In another example embodiment, a method is provided of displaying in the graphical user interface an updated graphical representation of an updated specification rate.

Other features and aspects of example embodiments are presented below in the Detailed Description when read in connection with the drawings presented with this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 illustrates a graphical user interface of predicted in-specification and out-of-specification output responses in at least one embodiment of the present technology.

DETAILED DESCRIPTION

Figure 1:
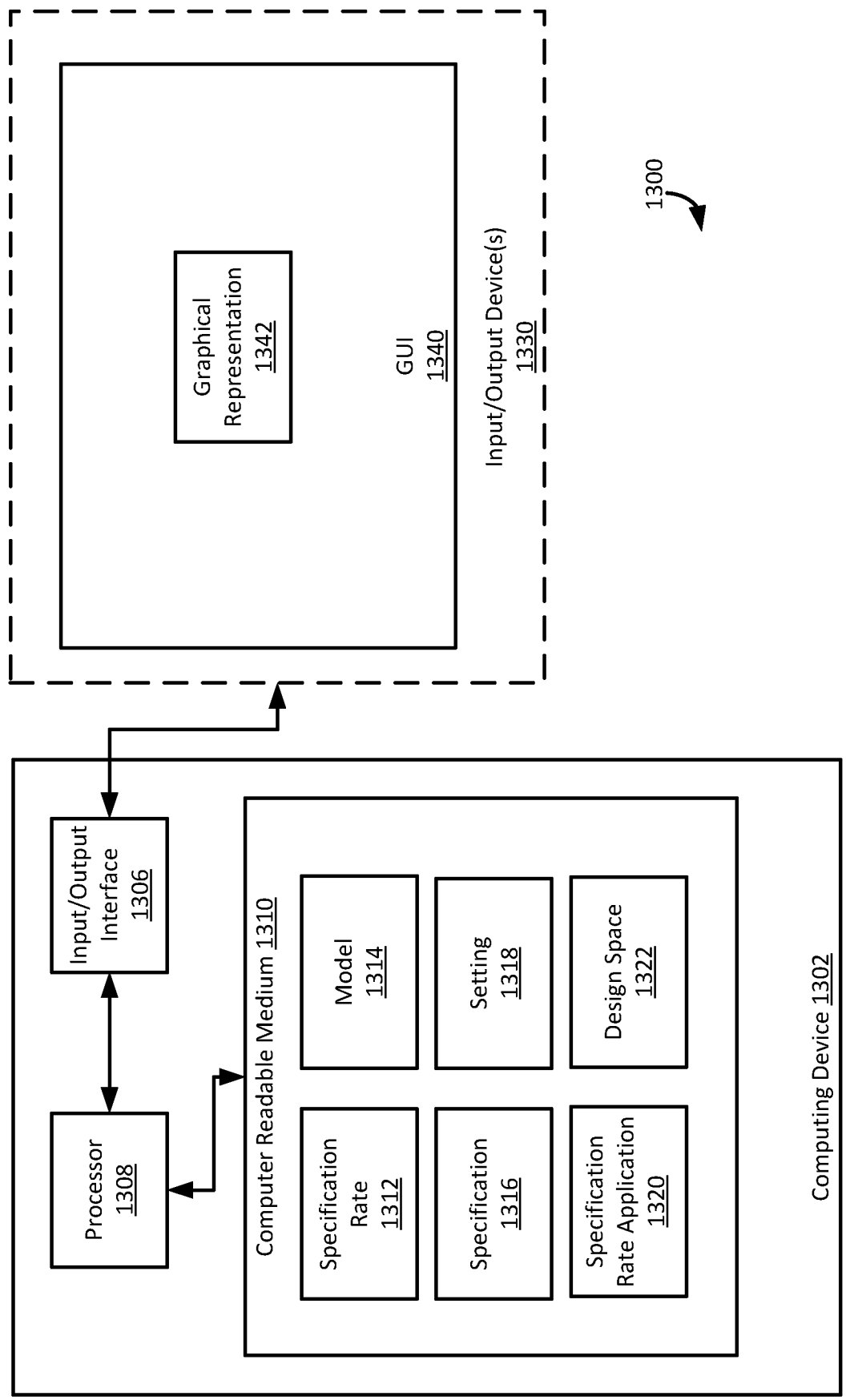
FIG. 1 illustrates a block diagram of a system for updating a specification rate according to at least one embodiment of the present technology.

In some industries there can be specification limits limiting allowed outcomes for a process or product. For example, in certain basketball organizations, basketballs have to be of a certain diameter (e.g., between 24-24.2 centimeters) and weight (e.g., at most 22 ounces). The manufacturer can have objectives for a specification rate (e.g., an in-specification rate or out-of-specification rate). For example, a manufacturer can desire that 98 percent of products satisfy the specification limits. An in-specification rate can indicate an out-of-specification rate and an out-of-specification rate can indicate an in-specification rate. For example, if 40 percent of products are in-specification, this can indicate 60 percent are out-of-specification. Accordingly, one of ordinary skill in the art will appreciate that examples using a particular type of specification rate (e.g., in-specification rate) can be used generally for other specification rates (e.g., out-of-specification rates).

Options for input variables for the manufacture can influence how likely it is that a manufactured product will meet specifications or achieve a desired specification rate. For example, a basketball process can involve winding an internal network of threads into a ball and applying a heated rubber coating to the thread. The winding speed, the temperature of the rubber, and the rubber thickness can all influence how likely it is that a certain portion of the basketballs are within specification limits (e.g., for weight and size). In designing the manufacturing process, a manufacturer may want flexibility in candidate options for factors of the manufacturing process but still ensure a certain likelihood of success in producing compliant products. For instance, in pharmaceutical manufacturing or structural devices there may be tough standards for products and a wide range of possible variation in developing the products.

For example, pharmaceutical manufacturing may be regulated by organizations such as the Federal Drug Administration (FDA). The FDA may have regulations that allow for approval of only a limited design space of input variables and candidate options for those input variables (e.g., material attribution factors or process parameters for pharmaceutical design) under quality by design parameters. In an FDA approval process, design space can be initially proposed by the applicant and may be subject to regulatory assessment and approval. Any deviation from the allowed design space may require getting reapproval of an approved process. It may be challenging for manufacturers or experiments to obtain a design space that gives maximum flexibility and still assures quality standards are met.

In these types of environments, an objective of a process engineer can be to set acceptable bounds (e.g., normal operating ranges, or in the more general engineering setting, specification limits on the factors) for what will be permissible for the manufacturing process and lead to a certain predicted level of in-specification products. Prediction formulas can be used to describe what combination of factor settings lead to responses that are in-specification, but prediction formulas are generally complex nonlinear functions. Mathematically, an objective may be to find the largest hyper-rectangle that fits within the complex constraints derived from the prediction expressions for the responses, but this is an intractable computational problem.

One or more embodiments herein provide an interactive graphical user interface allowing a user to change bounds and observe how that will influence predicted specification rates without needing to engage in complex computations. Predicted specification rates could be considered or called forecasted specification rates if they are predicted rates over time. Alternatively, or additionally, the graphical user interface can be used to auto-tune toward a desired specification rate. Embodiments can provide an improved user interface for setting and exploring limits for input variables and specification rates. For instance, one or more embodiments help set specification limits on the factors that honor the specification limits on the responses (e.g., helping to set up a design space in the sense used by quality by design principles defined by the FDA for a systematic approach to pharmaceutical development and manufacture to ensure quality products).

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

FIG. 1 illustrates a block diagram of a system for updating a specification rate according to at least one embodiment of the present technology. System 1300 includes a computing device 1302 (e.g., a desktop, a home computer, a laptop computer, a tablet, a personal digital assistant (PDA, a network device). In one or more embodiments, the system 1300 includes one or more input and/or output devices 1330 (e.g., for displaying a graphical representation 1342 or a graphical user interface 1340). For example, a graphical representation (e.g., a graph or table) can be used to display information relevant to a predicted specification limit or bound on candidate options. Alternatively, or additionally, computing device 1302 can be a computing system that comprises graphical user interface 1340 (e.g., a computing tablet). Accordingly computing device and computing system are used interchangeably in examples. Other input and/or output devices 1330 can be used that are not shown for simplicity (e.g., a keyboard or mouse to interact with an interactive graphical user interface, an additional database or computing system for storing or processing information). In examples where there are multiple devices in system 1300, system 1300 is configured to exchange information between devices in the system (e.g., via wired and/or wireless transmission). For example, a network (not shown, such as a computing environment network) can connect one or more devices of system 1300 to one or more other devices of system 1300.

The computing device 1302 has a computer-readable medium 1310 and a processor 1308. Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc. Computer-readable medium 1310 can include any numbers of memories or memory spaces (e.g., contiguous and noncontiguous).

Processor 1308 executes instructions (e.g., stored at the computer-readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. Processor 1308 in one or more embodiments can retrieve a set of instructions from a permanent memory device and copy the instructions in an executable form to a temporary memory device that is generally some form of RAM, for example. Processor 1308 operably couples with components of computing device 1302 (e.g., input/output interface 1306 and computer readable medium 1310) to receive, to send, and to process information.

In one or more embodiments, computer-readable medium 1310 stores instructions for execution by processor 1308. For example, the computer-readable medium 1310 has a specification rate application 1320 comprising computer instructions for obtaining at least one computing model 1314 configured to predict one or more output responses based on one or more input variables. The model could be developed by the computing device 1302 or received (e.g., via input/output interface 1306) and stored in computer readable medium 1310. The model could be a predictive model (e.g., with the predictive strength of the model built on how well the factors can be used to accurately predict the response and how well the model fits the factors). The model could be configured or developed in various manners (e.g., it could be user-defined and/or a machine-learning model).

Additionally, or alternatively, the specification rate application 1320 comprises instructions for obtaining a specification 1316 defining an allowed response set for the one or more output responses. The specification could be a default specification or could be input by a user (e.g., using graphical user interface 1340 and received via input/output interface 1306). The specification could be one or more specifications (e.g., a specification minimum and maximum for each of response variables). For instance, the specification could pertain to limits on the materials of the product (e.g., allowed ranges on a concentration of a chemical in the product), or processing constraints (e.g., maximum heating time).

Additionally, or alternatively, the specification rate application 1320 comprises instructions for receiving one or more settings 1318 for one or more bounds. For example, the setting 1318 can be an initial setting that defines one or more sets where each set of the one or more sets comprises one or more candidate options for a given input variable of one or more input variables. The initial setting could be default settings set by the computer (e.g., the maximum range of options used in generating a model), or it could be specified by a user. Additionally, or alternatively, the setting 1318 can be an updated setting (e.g., based on a user indication to change a set bound of the one or more bounds in the graphical user interface 1340 such that a given set of the one or more sets comprises more or fewer candidate options than according to the initial setting).

Additionally, or alternatively, the specification rate application 1320 comprises instructions for generating one or more design spaces 1322 for the input variables (e.g., defined by settings 1318). For example, generated design spaces could include an initial design space for the one or more input variables defined by an initial setting, and an updated design space for the one or more input variables defined by an updated setting.

Additionally, or alternatively, the specification rate application 1320 comprises instructions for displaying in a graphical user interface 1340 a graphical representation 1342. For example, the graphical representation 1342 can be an initial graphical representation of a generated specification rate (e.g., of candidate specification rates 1312). The generated specification rate indicates a portion of the initial design space predicted, according to a computing model, to generate a response within the allowed response set defined by the specification 1316. Accordingly, the generated specification rate can account for an initial setting 1318 and a computing model 1314. Additionally, or alternatively, the graphical representation 1342 can be an updated graphical representation of an updated specification rate (e.g., of candidate specification rates 1312). The updated specification rate indicates a portion of the updated design space predicted, according to the computing model, to generate a response within the allowed response set defined by the specification. Accordingly, the updated specification rate can account for a change in candidate options according to an updated setting. For instance, if the settings reduce the candidate options for manufacturing a product, then the specification rate may increase, or decrease, given the change in the nature of the manufactured products.

For simplicity, specification rate application 1320 is described as a single application. In other embodiments, operations of the specification rate application 1320 may be carried or implemented by multiple applications or additional or different operations can be carried out.

In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. The applications can be written using one or more programming languages, assembly languages, scripting languages, etc. One or more applications stored on computer-readable medium 1310 can be implemented as a Web application. For example, an application can be configured to receive hypertext transport protocol (HTTP) responses and to send HTTP requests. The HTTP responses can include web pages such as hypertext markup language (HTML) documents and linked objects generated in response to the HTTP requests. Each web page can be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed can be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 1302. For example, the one or more applications can be integrated with other analytic tools. Merely for illustration, the applications are implemented using, or integrated with, one or more software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML®. For example, the specification rate application 1320 can support a Design Space Profiler or integrated into a platform supporting a Design Space Profiler for providing a graphical user interface tool. Additionally, or alternatively, the specification rate application 1320 can be integrated into a modeling platform in JMP® Pro for obtaining a model. JMP® Pro includes features such as linear modeling features (e.g., Fit Model), a regression tree platform (e.g., Partition, a neural network platform, and Partial Least Squares platform).

As another example, input/output interface 1306 could be different interfaces (e.g., an interface for input and an interface for output). Alternatively, or additionally, the input/output interface 1306 has more than one input interface that uses the same or different interface technology. Alternatively, or additionally, the input/output interface 1306 has more than one output interface that uses the same or different interface technology.

Figure 2:
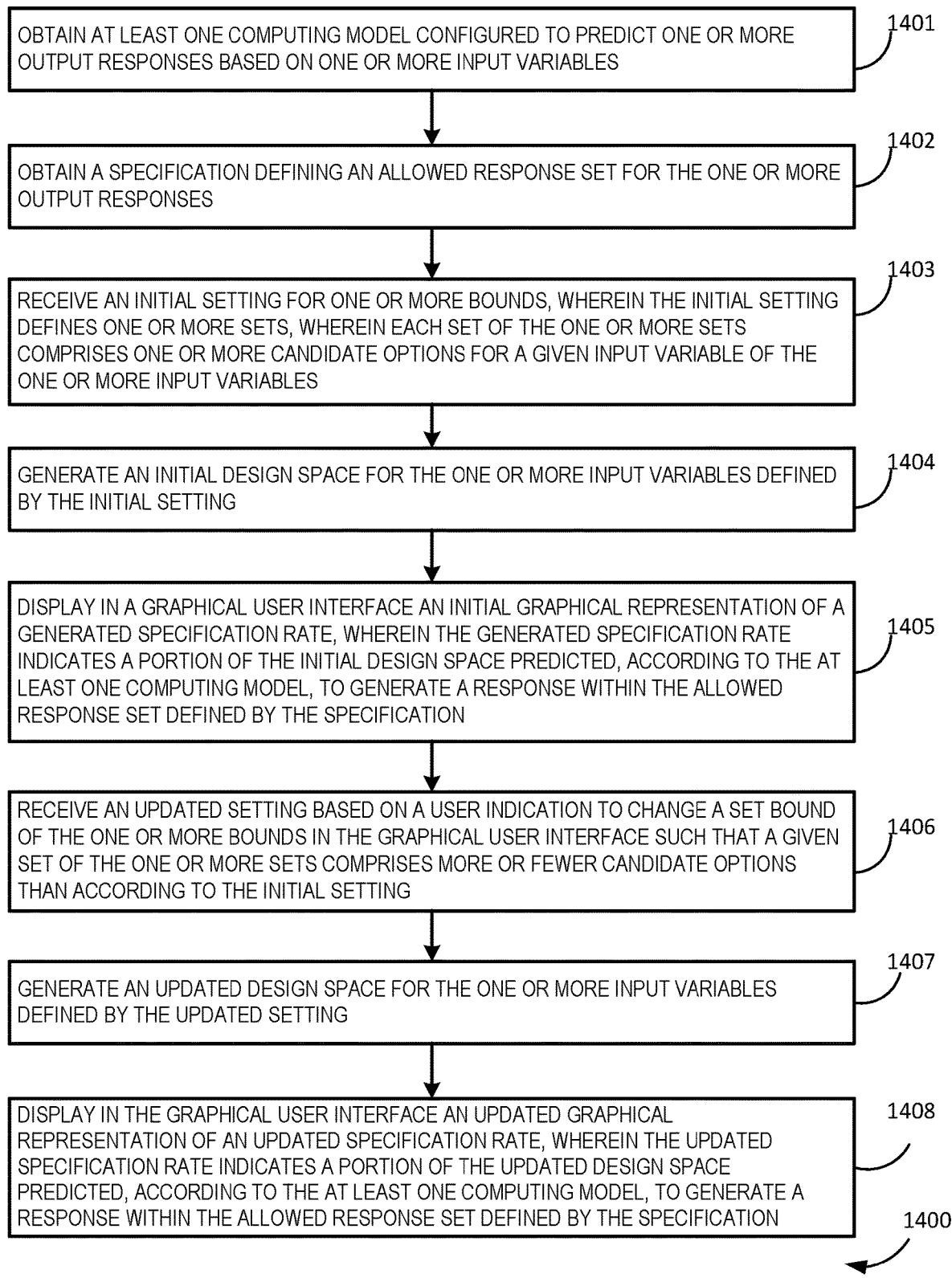
FIG. 2 illustrates a flow diagram for updating a specification rate according to at least one embodiment of the present technology.

In one or more embodiments, the system 1300 implements a method as described herein (e.g., a method shown in FIG. 2). FIG. 2 illustrates a flow diagram of a method 1400 for an interactive graphical user interface (e.g., a graphical user interface 1340 of FIG. 1). The method comprises an operation 1401 of obtaining at least one computing model configured to predict one or more output responses based on one or more input variables. For example, with a Design Space Profiler™ the model context could be a set of formula columns or a model fit predicting the responses with respect to the factors.

Figure 4:
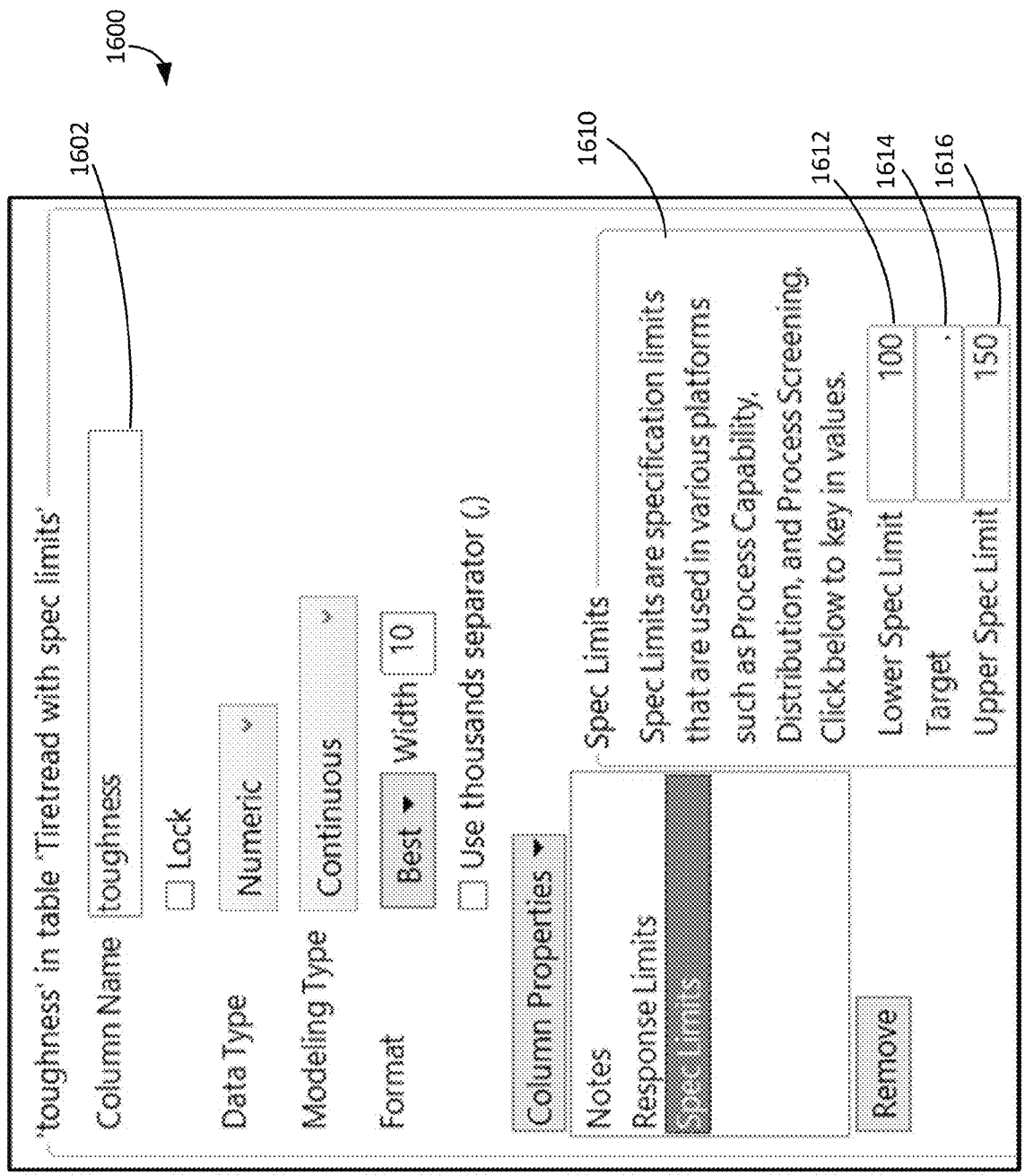
FIG. 4 illustrates a graphical user interface for obtaining a specification in at least one embodiment of the present technology.

The method comprises an operation 1402 of obtaining a specification defining an allowed response set for the one or more output responses. For instance, a computing system could allow a user to enter in maximum, minimum, or target goals for an output response. FIG. 4, which is described in more detail herein, provides an example graphical user interface for a user to specify specification limits.

The method comprises an operation 1403 of receiving an initial setting for one or more bounds. The initial setting defines one or more sets. Each set of the one or more sets comprises one or more candidate options for a given input variable of the one or more input variables. These bounds could be specified by the user or the computing system (e.g., the maximum range of options in data values used to generate a model in operation 1401).

The method comprises an operation 1404 of generating an initial design space for the one or more input variables defined by the initial setting. For instance, the initial design space can be a restricted design space with restricted options for an input variable constrained by the initial setting. As another example, the initial setting may not define bounds for all the input variables and bounds may be generated (e.g., at the edges, or some offset from the edges, of available data sets for input variables).

The method comprises an operation 1405 of displaying in a graphical user interface an initial graphical representation of a generated specification rate. The generated specification rate indicates a portion of the initial design space predicted, according to the at least one computing model, to generate a response within the allowed response set. Accordingly, the generated specification rate can account for the initial setting and the at least one computing model. For instance, the generated specification rate can be a predicted specification rate after inputting to the model options according to the initial setting. The generated specification rate can be one of candidate specification rates. For instance, the computing system can generate predictions for candidate specification rates wherein the candidate specification rates each indicate a portion of a given design space predicted, according to the at least one computing model, to generate a response with the allowed response set defined by the specification. For instance, a computing device can display the initial graphical representation by generating a graph of predicted specification rates to other bound options for a set bound. A graph can include, for example, a graphical representation, or stored data, representative of a relationships between data (e.g., functions, curves, data points connected by line segments, etc.). A computing device can provide one or a related group of predicted specification rates in a graph or table.

The method comprises an operation 1406 of receiving an updated setting based on a user indication to change a set bound of the one or more bounds in the graphical user interface such that a given set of the one or more sets comprises more or fewer candidate options than according to the initial setting. For instance, the graphical user interface can be interactive and allow a user to adjust the bounds as desired and have updates in the design space and graphical representation.

For example, the method comprises an operation 1407 of generating an updated design space for the one or more input variables defined by the updated setting. The method comprises an operation 1408 of displaying in the graphical user interface an updated graphical representation of an updated specification rate (e.g., of candidate specification rates). The updated specification rate indicates a portion of the updated design space predicted, according to the at least one computing model, to generate a response within the allowed response set defined by the specification. Embodiments described here will show examples of interactive graphical user interfaces used for updating a specification rate.

Method 1400 is presented merely as an example. One of ordinary skill in the art will appreciate that the method 1400 could be implemented differently (e.g., with more or fewer operations, or operations in a different order). For example, operations could be combined or additional operations added. For example, operation 1405 could further include obtaining an updated model. Operation 1406 could include displaying in the graphical user interface the updated graphical representation of the updated specification rate that accounts for the updated setting and the updated model. Further, operations could be repeated for instance. A computing system may receive additional updated settings as in operation 1405 and again update the graphical representation as described with respect to operation 1406.

Figure 3:
FIG. 3 illustrates a graphical user interface of input and output responses for a model in at least one embodiment of the present technology.
Figure 4:
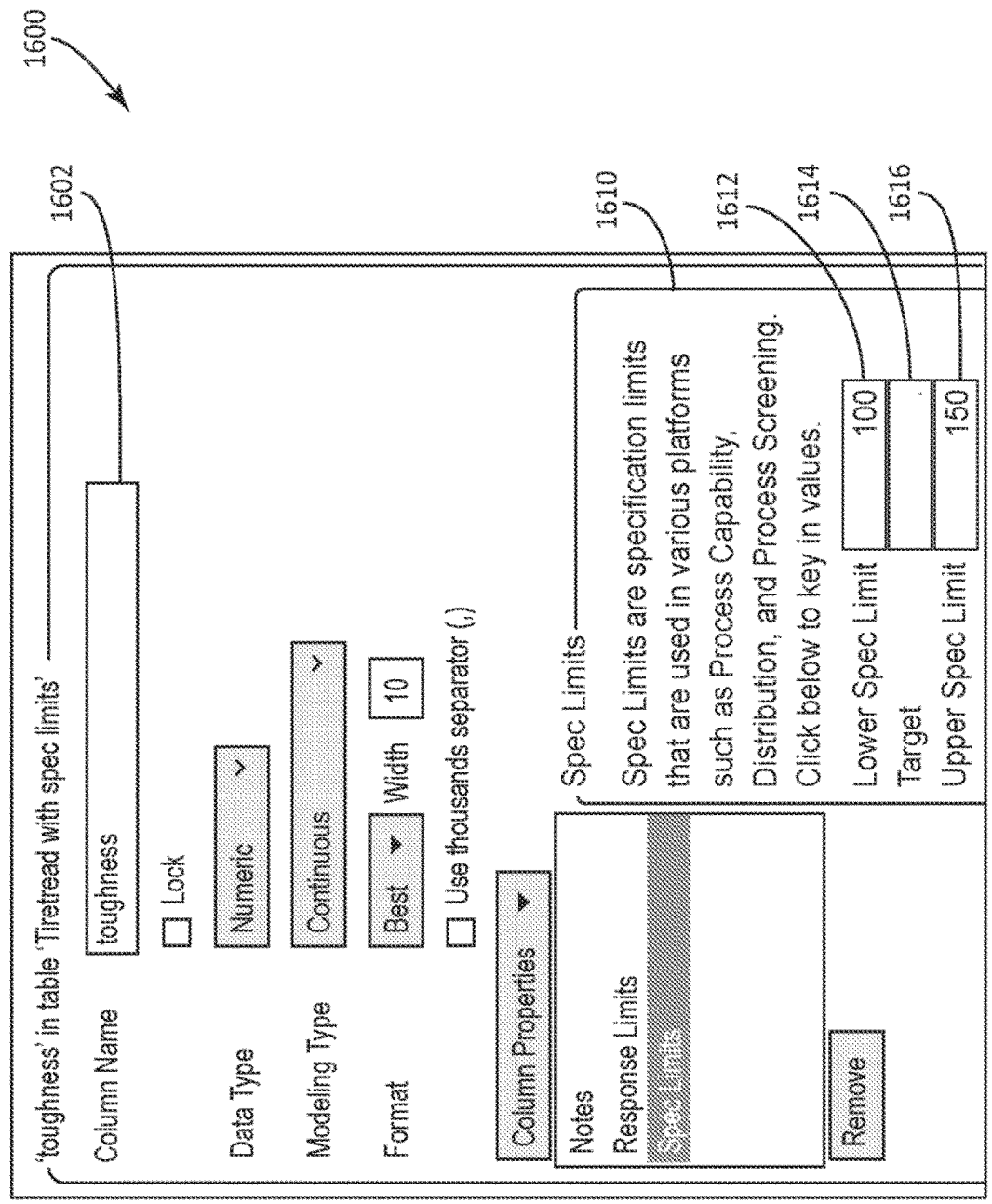
Figure 5A:
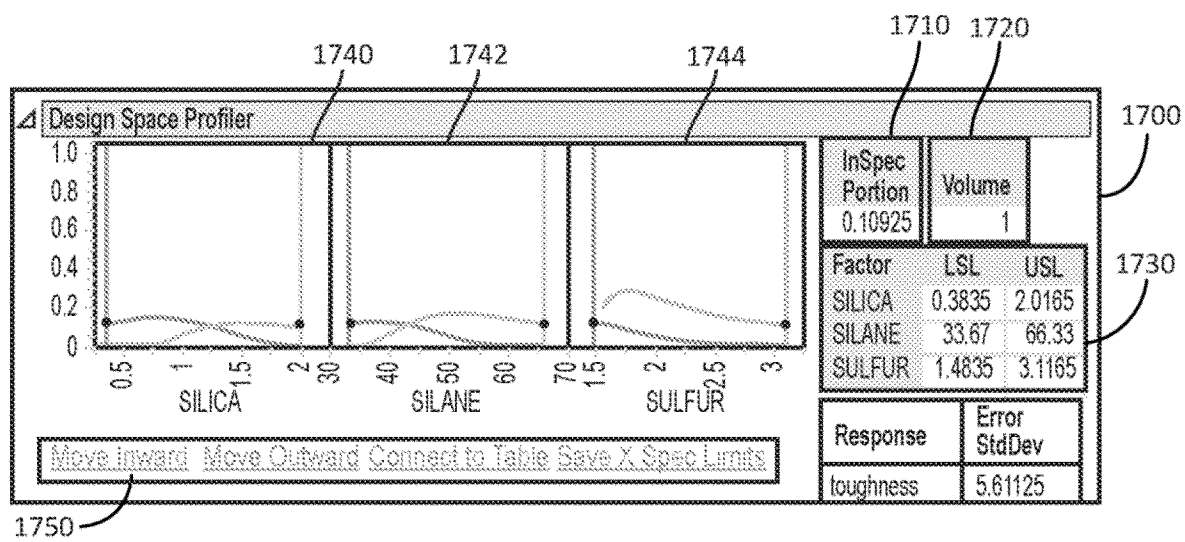
Figure 5B:
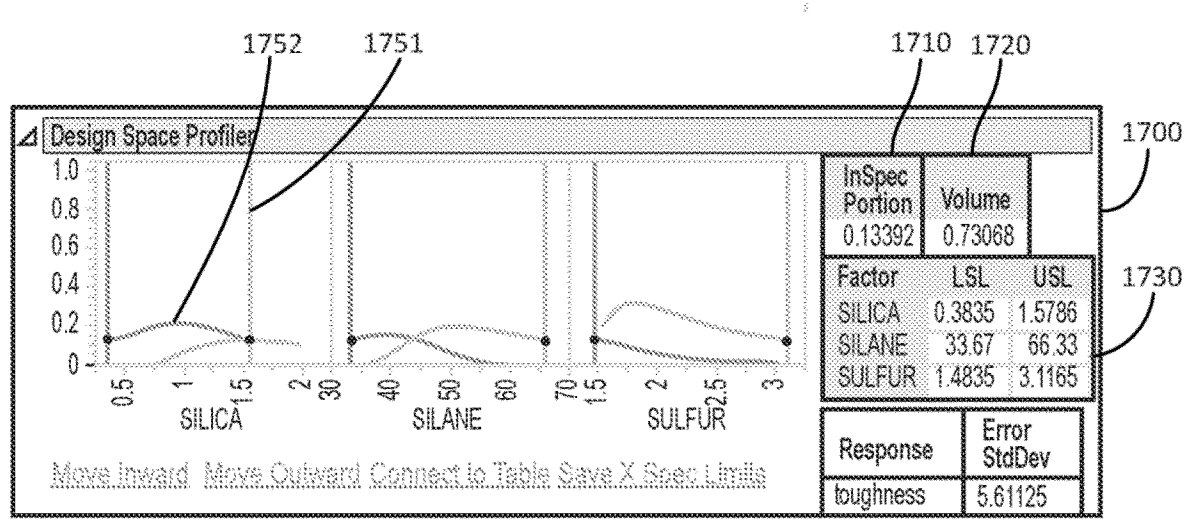
Figure 5C:
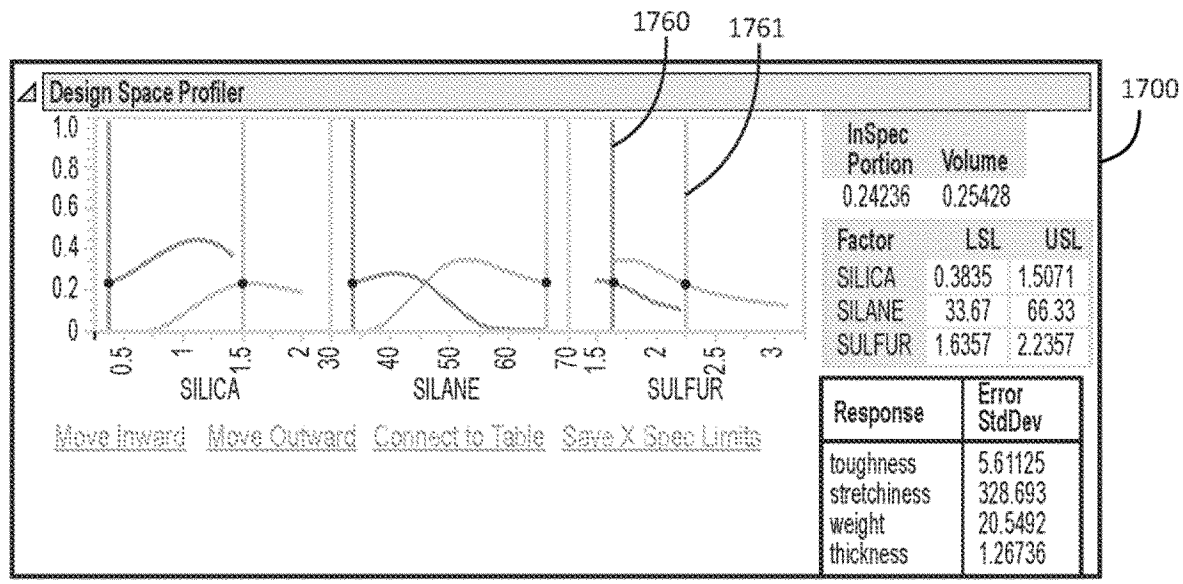
Figure 5D:
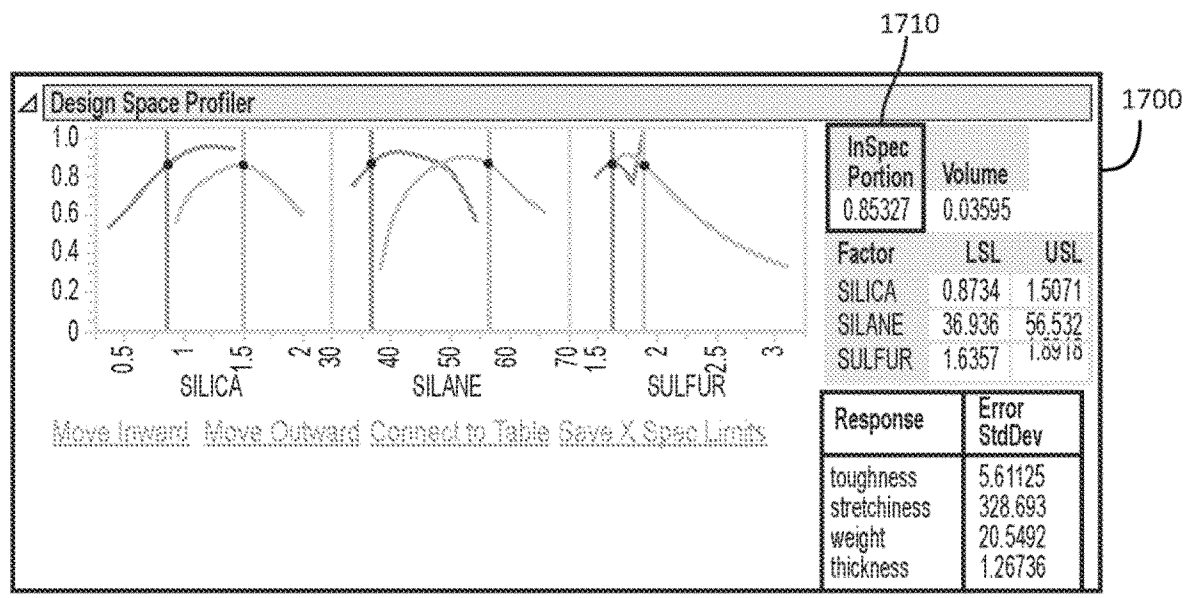
Figure 6A:
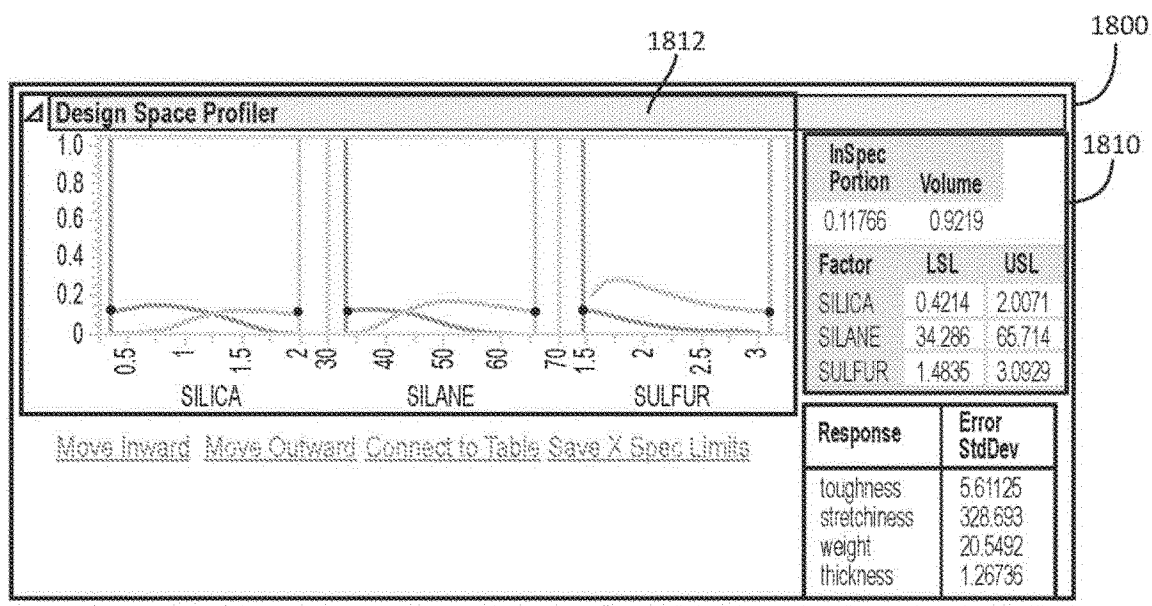
Figure 6B:
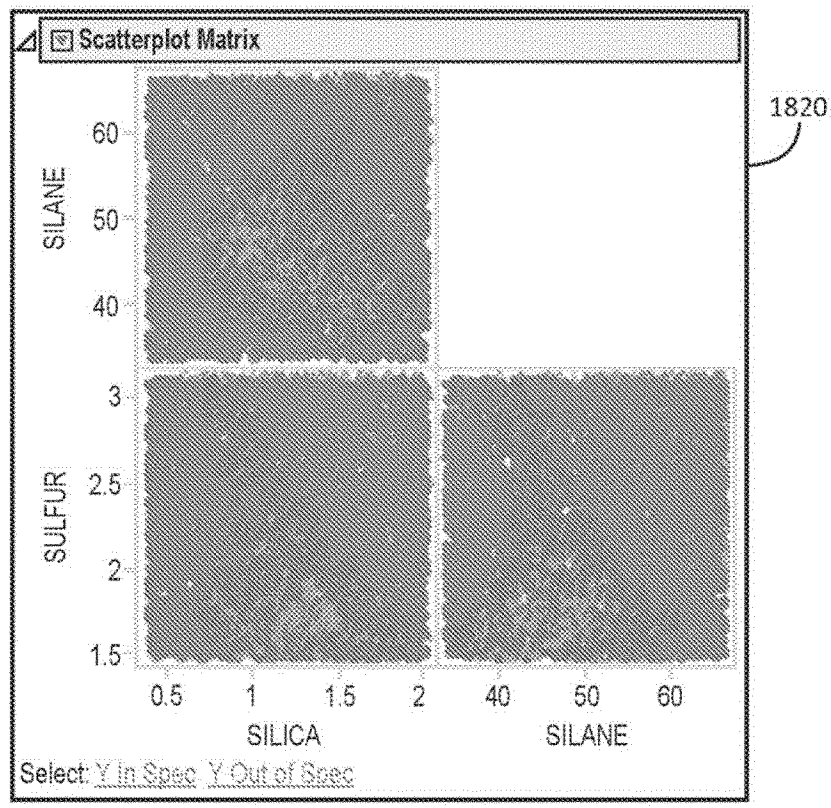
Figure 6C:
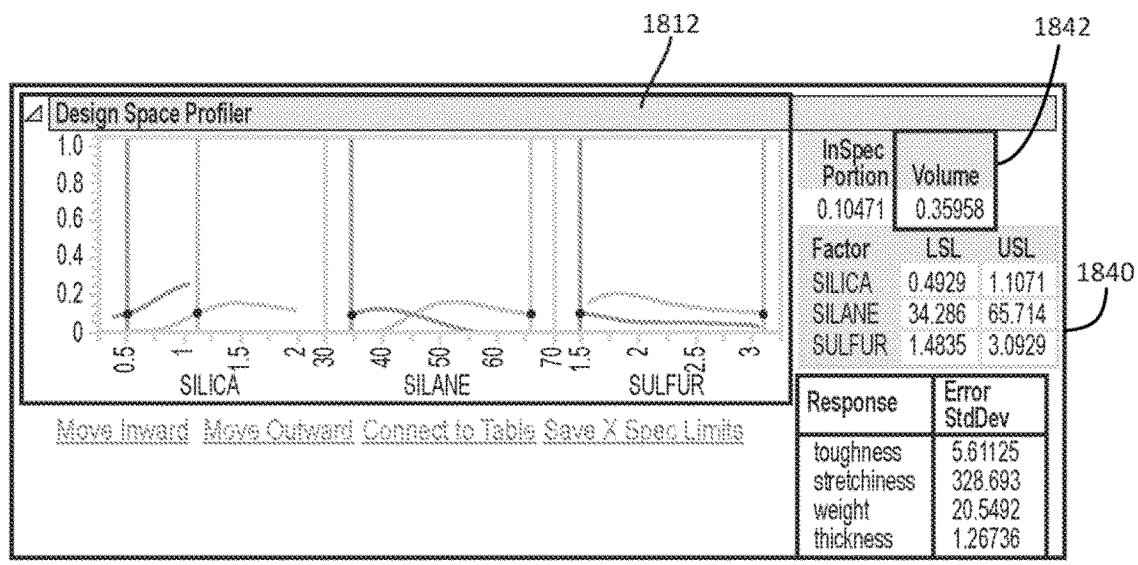
Figure 6D:
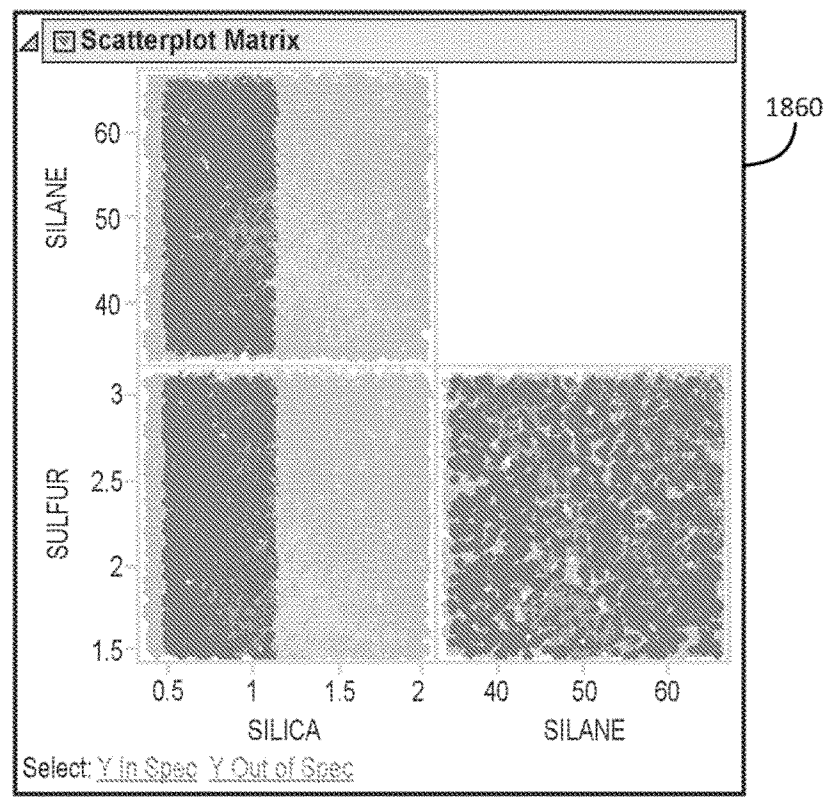

FIG. 3 illustrates a graphical user interface 1500 of input variables and output responses according to a model generated on a JMP® platform. In this example, computing system obtains a model by selecting model settings 1510 for controlling the modeling used by a computer system and/or to select one or more modeling platforms or types (e.g., based on a neural network model, linear regression model, or research surface model, RSM). The user can also select input variables 1530 and output responses 1520. In this example, the model relates to manufacture of tires and is derived from sample data 1540. The sample data 1540 in this example is adapted based on data from Derringer and Suich (1980) "Simultaneous Optimization of Several Response Variables" Journal of Quality Technology, 214-219.

In this example sample data 1540, different materials are used to manufacture tires (silica, silane, and sulfur), and different amounts of these materials in the manufacture can be used by the model to predict how the tire will perform in different categories (e.g., toughness, stretchiness, weight, and thickness).

In one or more embodiments, the computing system can obtain or generate multiple predictive models, or a multi-output model, for multiple types of output responses (e.g., a separate model for each of the output responses 1520). Additionally, or alternatively, a modeling platform can be used to provide constraints on models or allowed options for models (e.g., disallowed combinations). A model can be used to generate additional datapoints comprising computer generated (allowed) options for input variables and computer predicted output response values for these various computer-generated options for each of the input variables 1530. These additional datapoints can be used, for example, for predicting if products according to the options will be within a standard or a specification.

In one or more embodiments, an obtained model can be used to display a graphical representation (e.g., an initial or updated graphical representation). For instance, a computing system can display an initial graphical representation by generating initial data points for each input variable of the one or more input variables across a range of candidate inputs as defined by the initial setting for one or more bounds and generating a representation of related group of specification rates. For instance, the computing system can depict in the initial graphical representation the generated specification rate indicating the predicted amount of the initial data points that would be in-specification.

FIG. 4 illustrates a graphical user interface 1600 for obtaining a specification. In the example in FIG. 4, the graphical user interface 1600 is used to set a specification for the output response 1602 (toughness of the tire). Specification Limits 1610 is used to define the specification for this response variable. In one or more embodiments, a computing system obtains the specification by receiving a user indication of an upper and lower bound for at least one of the one or more output responses. For instance, in this case a user can enter or select a default lower specification limit 1612 and an upper specification limit 1616 to set the range of permissible output responses (e.g., between 100 and 150). Other specifications could be used (e.g., a particular target value 1614 such as 125). In this example, specification limits are put on the responses since the goal is to improve the in-specification rate of the responses.

In this example, an individual specification is set. In other examples, the computing system can obtain the specification by obtaining a cumulative specification defining an allowed response set for each of the multiple types of output responses. For instance, different individual specification limits can be set on multiples ones of the output responses and a product is said to be in-specification only when all of those specification limits are met.

In one or more embodiments, a user can adjust bounds for permissible options for input responses to see how this will influence a predicted specification rate generated by the computing system. FIGS. 5A-D illustrate a graphical user interface 1700 for adjusting set bounds of candidate options for input responses. Each input response can have its own cell for depicting information specific to that input response. For example, cell 1740 is a cell for input variable silica, cell 1742 is a cell for input variable silane, and cell 1744 is a cell for input variable sulfur. The horizontal axis of each cell shows the range of candidate values for each variable of the cell and the vertical axis shows a predicted specification rate given the range of included candidate values. The maximum possible range may be user defined or set based on an existing data set.

Figure 5A:
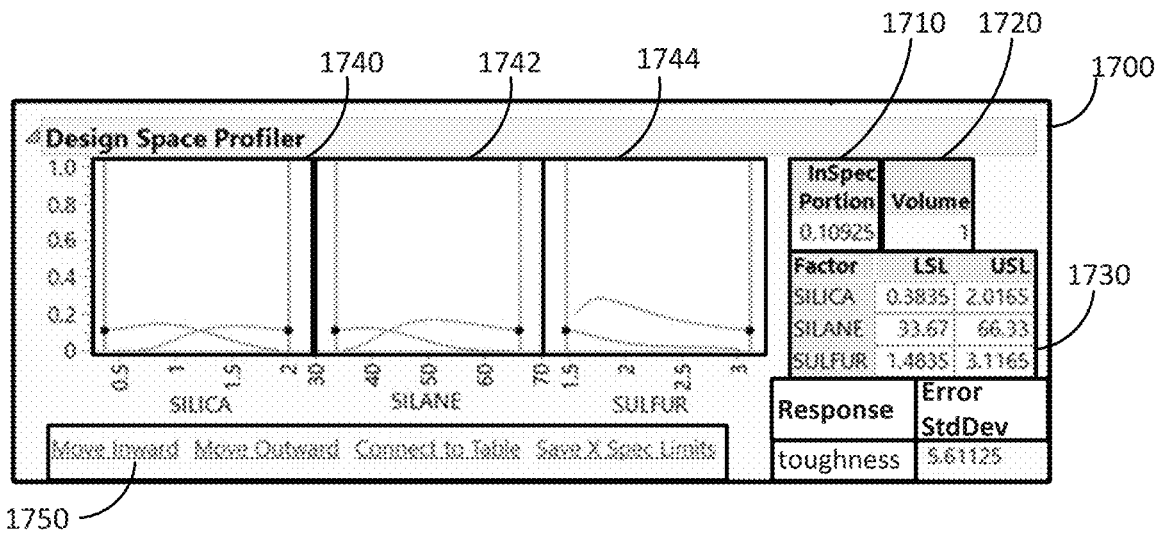
FIGS. 5A-D illustrate a graphical user interface for adjusting set bounds of candidate options for input responses in at least one embodiment of the present technology.

In FIG. 5A, the volume field 1720 expresses the volume relative to the design space normalized to 1. In this example, the initial setting of the bounds includes the entire design space or all possible candidate values for the input responses, so the normalized volume in volume field 1720 is 1. If the bounds are changed to narrow the design space or candidate values, the normalized volume will reduce. The graphical user interface 1700 shows a current in-specification rate in in-specification field 1710 is 0.10925, which is a portion of the total normalized volume of generated data points.

The specification rate could have been expressed differently (e.g., a percentage such as 10.925%). The specification-rate indicates that with the initial settings of table 1730, the computing system predicts that approximately 10 percent of tires manufactured will meet the user specified specification as explained in more detail herein.

In one or more embodiments, a computing system receives an updated setting based on a user indication indicating to change the set bound of the one or more bounds by changing in the graphical user interface one or more of: a graphical representation of a set bound of the one or more bounds (e.g., by moving a marker or changing the value for the lower specification limit, LSL, or upper specification limit, USL, in table 1730); a graphical representation of the generated specification rate (e.g., the rate in in-specification field 1710); a graphical representation of an individual setting (e.g., a specification rate or bound) corresponding to a given input variable of the one or more input variables; and a cumulative setting (e.g., a specification rate or bound) for the one or more input variables.

In this example, the graphical user interface 1700 is a profiler that shows for each continuous variable the predicted in-specification rate (e.g., a predicted in-specification rate based on setting the lower and upper specification limits). Each cell of the profiler (e.g., cell 1740, cell 1742, and cell 1744) for continuous factors shows in a graph two lines: a blue vertical line for the current lower specification limit, and a green vertical line for the current upper specification limit. The graphical user interface 1700 in this example is interactive in that a user can select one of the vertical lines to move it back and forth to change the bound settings in one cell (e.g., cell 1740) and predicted in-specification rates shown in other cells are simultaneously updated (e.g., in cell 1742 and cell 1744).

Additional curves in a cell show predicted changes to the specification rate if the bound is changed with the blue curve being associated with changes to the lower specification bound and the green curve being associated with changes to the upper specification bound. These predictions can be automatically updated as bounds are changed in another cell. Accordingly, this graphical user interface 1700 advantageously also shows a relationships of predicted specification rates that can help guide a user or the computing system to identify limits that would increase or decrease the in-specification rate the fastest (i.e., with the least change in bounds). As limits are moved inward, other factors can then become better opportunities for increasing the in-specification rate. In this example, the user can also move the bounds incrementally using control options 1750 (e.g., move inward, move outward which will move it inward or outward to the step that has a better, or the best, in-specification rate). The colors green and blue were chosen merely as an example. Other colors or patterns could be used to represent information pertaining to an upper and lower bound, or predicted specification rates versus a selected specification rate. Alternatively, no distinction could be made between upper and lower bound other than its relative locations in the graph.

Additionally, the graphical user interface 1700 in this example displays an initial graphical representation of the generated specification rate by displaying a table with an in-specification field 1710 indicating the generated specification rate and displays the updated graphical representation of the updated specification rate by updating the table. The specification rate could be displayed in alternative or additional ways (e.g., by using the graph to manually determine the in-specification rate on the vertical axis of cell 1740).

In one or more embodiments, a computing system displays the initial graphical representation by displaying at least one graph (e.g., graph in cell 1740) representing, for a given input variable (e.g., silica) of the one or more input variables, an association between predictions for the candidate specification rates and a given bound for candidate options for the given input variable. The computing system displays a marker on the at least one graph for the given bound (e.g., a vertical line), and the computing system receives a user indication to change the set bound of the one or more bounds by moving the marker.

Figure 5B:
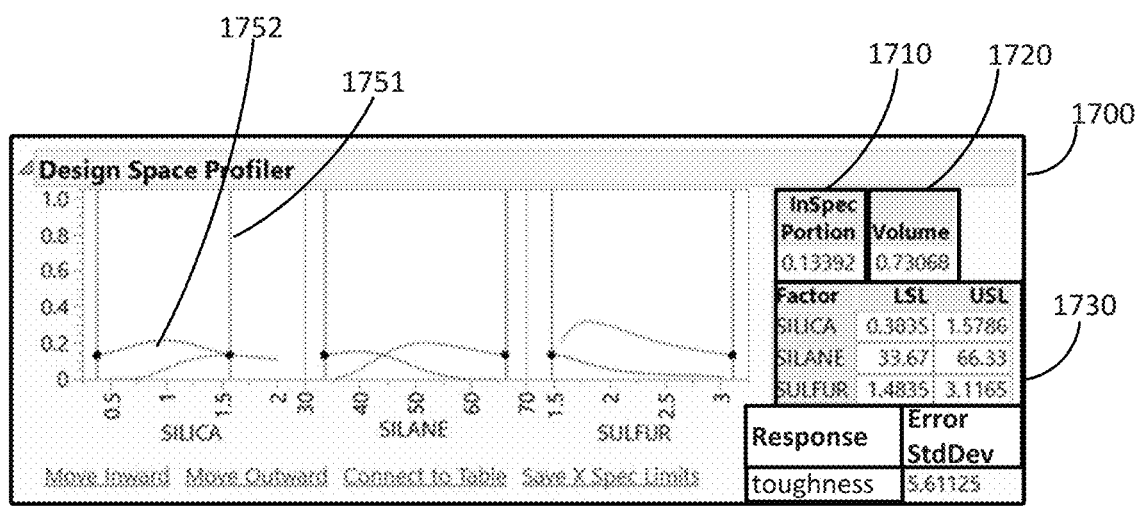

FIG. 5B shows the graphical user interface 1700 at a different time point when the user has adjusted the upper bound by moving the marker 1751 for input variable silica. The change to the upper bound is reflected in the table 1730. Also, the in-specification field 1710 and the volume field 1720 are updated. The volume of allowed datapoints is reduced since the upper bound limit has been lowered, but the in-specification rate has improved to 13% of products anticipated as being within specification.

The graphical user interface 1700 of FIGS. 5A-5B shows graphs (e.g., a graph in cell 1740) depicting a representation of predicted specification rates responsive to changes to a set bound of the one or more bounds to increase or decrease candidate options of a given set of the one or more sets. For instance, based on the change of the upper bound by moving the marker 1751 the volume decreased in volume field 1720. Additionally, the curve 1752 represents the predictions for changes in the lower bound of cell 1740 has generally increased and become more pointed as the upper bound is adjusted. Accordingly, the graph in cell 1740 has been updated to account for the user indication to change the upper bound. The specification rate has been updated in in-specification field 1710 and the new specification rate is shown at the intersection of the set bound (represented by the upper bound marker 1751) and the related group of predicted specification rates (represented here as curve 1752) in the updated graphical representation of cell 1740.

In one or more embodiments, a computing system displays in a graphical user interface (e.g., graphical user interface 1700) the initial graphical representation by displaying, in proximity to a specification rate (e.g., in-specification field 1710) bounds for each of the multiple different input variables (e.g., table 1730). A generated specification rate and an updated specification rate are each in-specification rates that indicate different portions of the one or more output responses predicted to be within the allowed response set of the total of the one or more output responses.

Figure 5C:
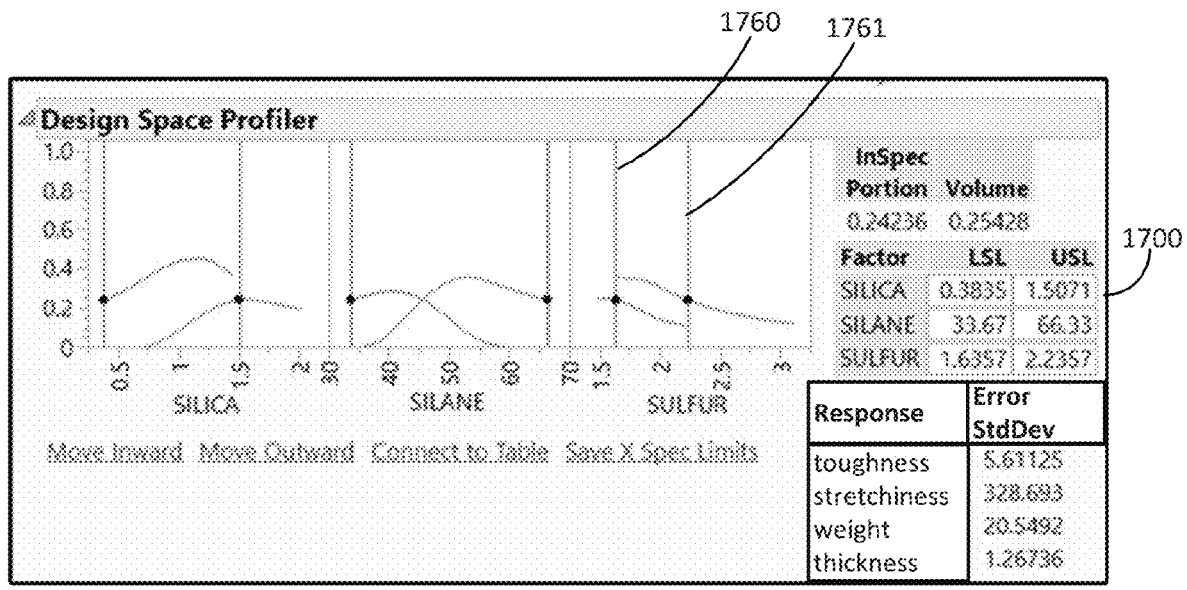
Figure 5D:
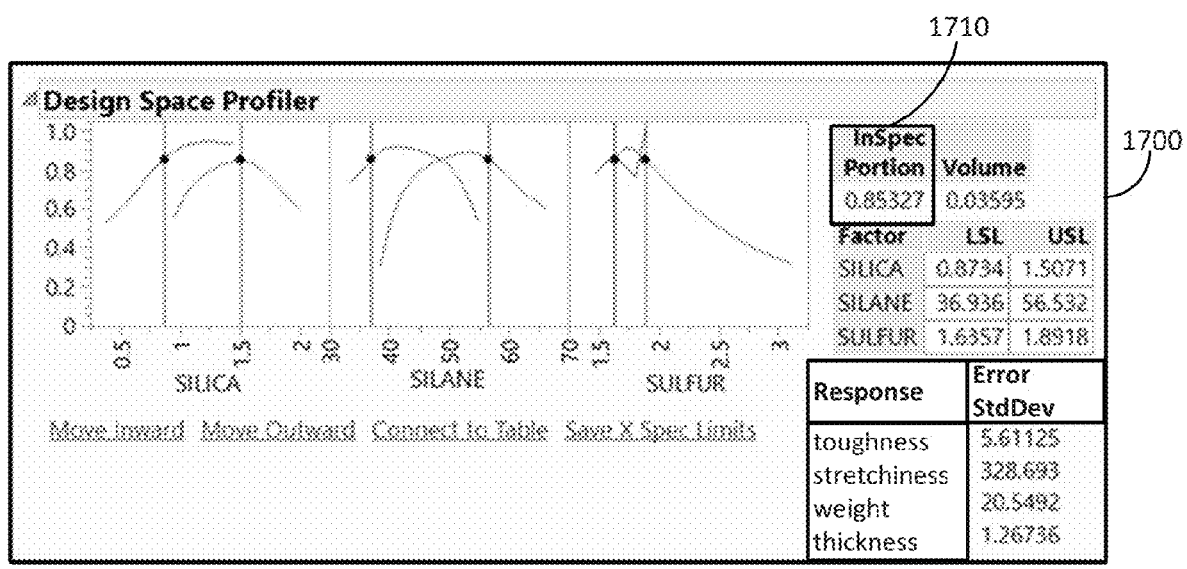

As shown the interactive graphical user interface 1700 allows a user to improve or move toward maximizing an in-specification rate by making narrow changes to the option ranges for the factors. This can enable a user to visualize balancing the need for in-specifications responses with another need to have a reasonably wide specification range for the factors. This can allow for hard-to-control variation. For instance, FIG. 5C shows a further adjustment in adjusting the upper bound of sulfur 1761 and the lower bound 1760 of sulfur. By making an adjustment to the upper bound and only a small adjustment in the lower bound, the in-specification rate changed from 13% to 24%. FIG. 5D shows that significant in-specification portions can be achieved by adjusting the bounds. FIG. 5D shows an in-specification rate of 0.85327 or 85% in in-specification field 1710.

An interactive graphical user interface described in embodiments (e.g., graphical user interface 1700) can be useful in developing products (e.g., industrial products like tires). For instance, the input variables can comprise one or more factors for developing a batch of products within a development process (e.g., the manufacture materials as in the example in FIGS. 5A-D or other processing constraints like heating temperatures or forces to bond materials). The initial graphical representation can display for each of the factors a respective lower bound and a respective upper bound for candidate options for the factors within the development process. The bounds can be used by a user to change an upper or lower bound for the development process. The computing system can receive an updated setting for the bounds by receiving a user indication to change the respective lower bound or the respective upper bound.

Tools described herein can be useful for other products than those described herein. For instance, industrial products such as chemicals, metals, ceramics, polymers, composites, woods, or a combination of materials, etc. The industrial product may be consumed, used to produce, or form a component of a manufactured product in a final form. For instance, the industrial product could include a blade part for a table saw. The outcome response could relate to the blade part (e.g., circumferences) or how well it performs in the table saw (e.g., use time before chipping). As another example, the industrial product could be a chemical for forming, or consumed in forming, a cleaner. The output response could relate to the final product itself (its pH) or its processing to produce the cleaner (e.g., how much stirring is needed to produce the cleaner of a certain consistency).

A computer-generated specification rate or updated specification rate responsive to an updated setting can represent a ratio of batch of products predicted to be within specification over the total of all products in the batch. For instance, if the manufacturing process stays defined to the bounds in FIG. 5D then 85% of products would be predicted to be withing specification. After some adjusting, it seems that the Silane factor can be left with a fairly wide spec interval (36.936 to 56.532), with narrower specification intervals for the other two factors.

This interactive graphical user interface can be useful in other industries where the user wants to narrow the specification limit ranges enough to achieve a good in-specification rate and still leave room for variation in the factors. For instance, the interactive graphical user interface can be useful for FDA approval processes where a user wants to have flexibility in bounds to avoid restarting the approval process but wants to ensure reasonable quality metrics.

In the example in FIGS. 5A-5D, the computing system used uniform distributions in the factor space in determining candidate data points and calculating the response in-specification rate. Other distributions could be used as appropriate for the situation such as normal distribution where more data points are generated in the middle of the upper and lower bounds.

In the example in FIGS. 5A-5D a model was obtained by obtaining one or more predictive models predicting the multiple output responses according to settings for multiple different input variables of the one or more input variables. In this example, the multiple different input variables comprise three input variables. In other examples, more or less input variables could have been used. In this example, the in-specification field 1710 indicates a cumulative likelihood of being within specification or within an allowed response set accounting for the settings for the multiple different input variables. Alternatively, or additionally, the in-specification field 1710 could have indicated individual portion of being within specification for individual output response specifications (e.g., toughness) as described with respect to FIG. 14.

By being able to account for three or more variables, the graphical user interface presents an improvement over other approaches to determining bounds for an experiment or process that used contour plots for two variables at a time. This example is complicated for a contour approach because it has four responses and three factors. With three factors, the contour profiler can show only 2 factors with a fixed off-axis factor not representing an interval. By instead using the interactivity of example embodiments, a user can move the vertical lines to move it back and forth to change the limits for a variable and can account for and observe how bounds influence specification rate predication across greater numbers of variables. For instance, the user can move the bounds such that two responses are maximized, and the user can use lower specification limits to allow two responses to be held at an acceptable interval.

One or more embodiments provide additional or alternative visualizations for the user to better understand the factor and/or response spaces. For instance, in the examples in FIGS. 5A-5D a metric was used to represent the volume of generated data points for input variables. FIGS. 6A-6D illustrate graphical user interfaces for additional volume representations for input variables.

Figure 6A:
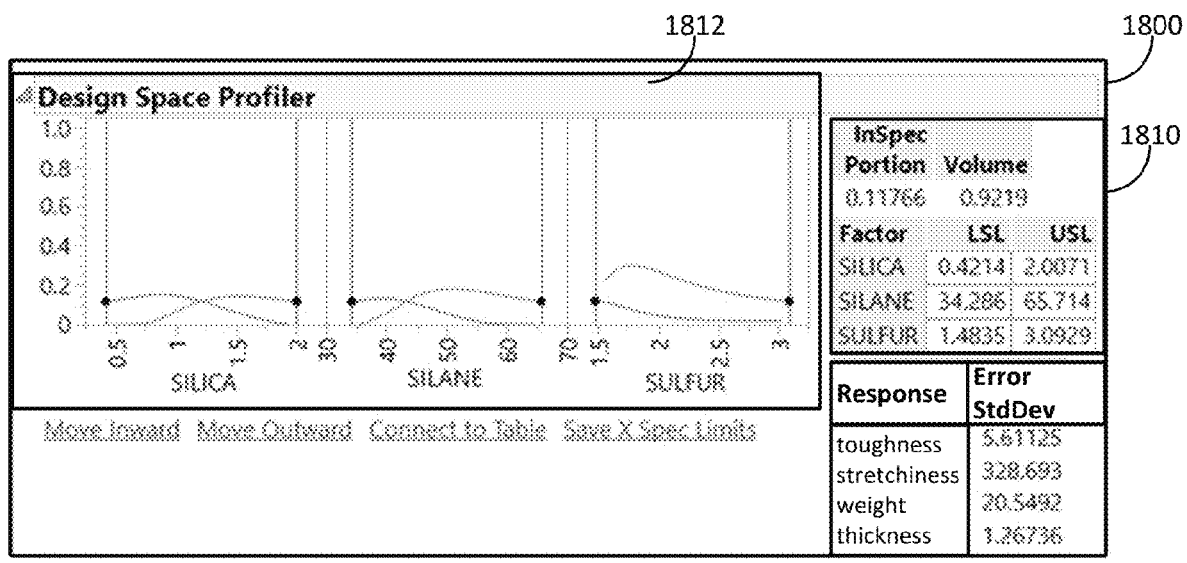
FIGS. 6A-D illustrate a graphical user interface for volume representations for input variables in at least one embodiment of the present technology.
Figure 6B:
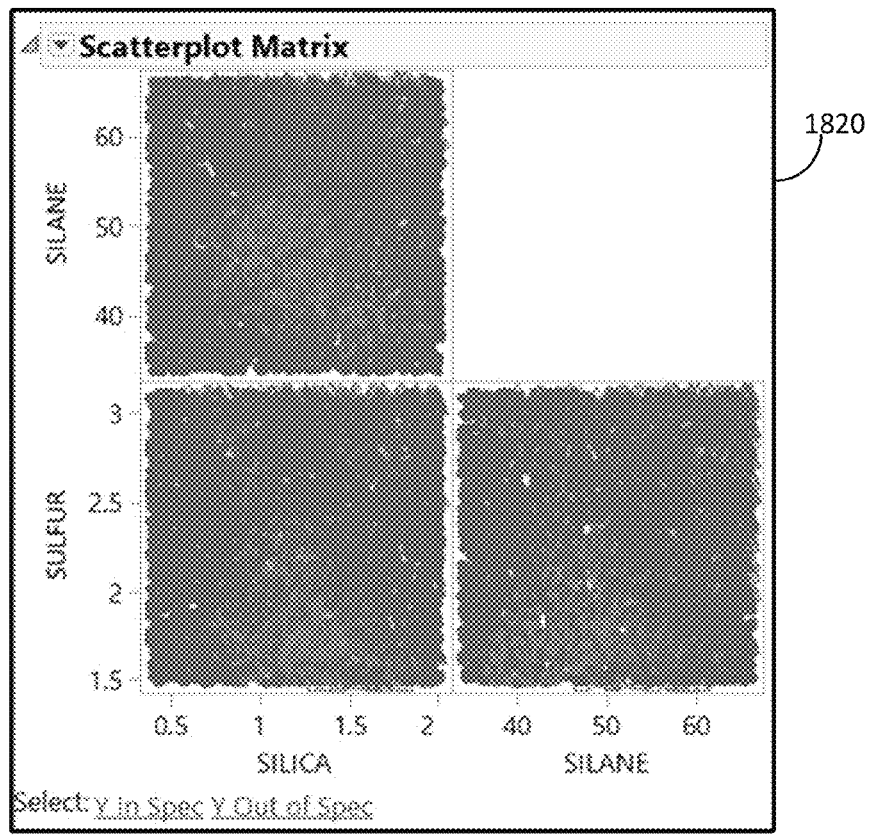

For instance, a portion 1800 of a graphical user interface is shown in FIG. 6A. The portion 1800 has fields, features and controls that are the same as, or similar to, those shown and described with respect to FIGS. 5A-5D. For instance, FIG. 6A includes graphical representations including a table 1810 and graphs 1812. As shown in FIG. 6B the graphical user interface can additionally show a graphical representation 1820 of generated date points for the input variables in a scatter plot. Points in red are used to show data points that are predicted to be outside the specification and data points in green are predicted to be inside the specification. In other words, if a tire was made with the certain silane, sulfur and silica concentrations as represented by the data point, it is predicted to meet or not-meet the specification as indicated by the color of the datapoint. Different colors could have been used to create this visual distinction. Since the volume field is nearly at 1, where a volume of design space for all the input variables is normalized to 1, most of the data points generated were designated a specification in the graphical representation 1820.

In one or more embodiments, a computing system generates a distribution of one or more candidate options for the one or more input variables and corresponding output responses according to the model. Graphical representation 1820 can be used to provide the user with a visualization of the generated distribution. As shown the computing system has an initial setting that reduces candidate options by excluding, according to the one or more bounds, given candidate options in the distribution since the volume is only at 0.9219. However, the user can further update settings for the bounds by including excluded candidate options according to the initial setting or excluding additional candidate options according to the initial setting.

Figure 6C:
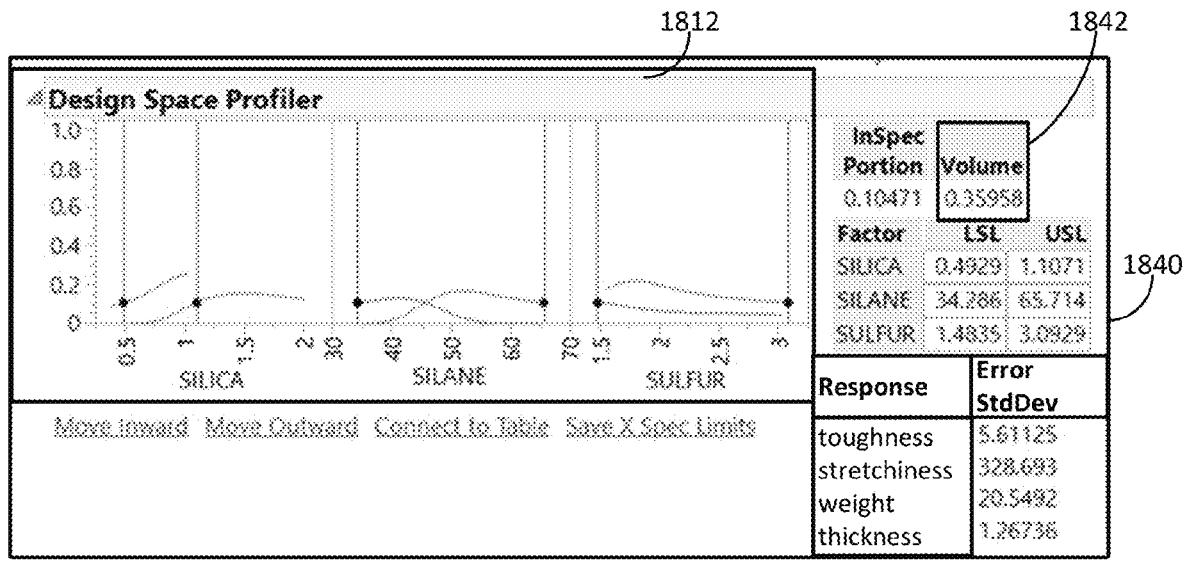
Figure 6D:
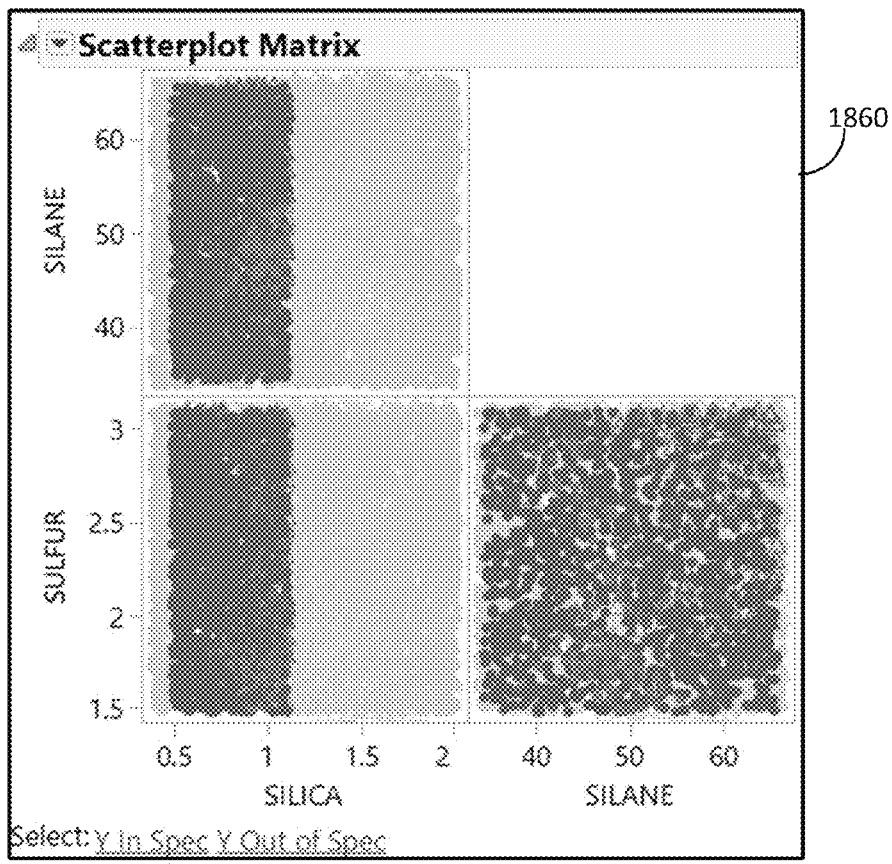

FIG. 6C shows an updated portion 1840 of a graphical user interface for the initial portion 1800 in FIG. 6A based on excluding additional candidate options. The user adjusted bounds in the graphs 1812, which reduced the volume as shown in volume field 1842 to 0.35958. FIG. 6D shows an updated graphical representation 1860 for the initial graphical representation 1820 in FIG. 6B. The portion has been reduced by reducing the color saturation of the data points no longer considered in computing the specification rate. These data points are no longer considered because they are out of the allowed bounds. Other tactics could have been used such as graying out the data points no longer considered.

Visualization tools like Scatterplot Matrixes can be useful because it can happen that out-of-specification data points are in corners, and this can be helpful for setting the bounds. The computing system can display one or more graphs (e.g., the graphical representation 1860 of FIG. 6D) indicating included and excluded candidate options for the one or more input variables. The graphs can help show that included candidate options are used for deriving the updated graphical representation of the updated specification rate and excluded candidate options are not used for deriving the updated graphical representation of the updated specification rate. The user can adjust the bounds to ensure data points are included as desired.

Figure 7A:
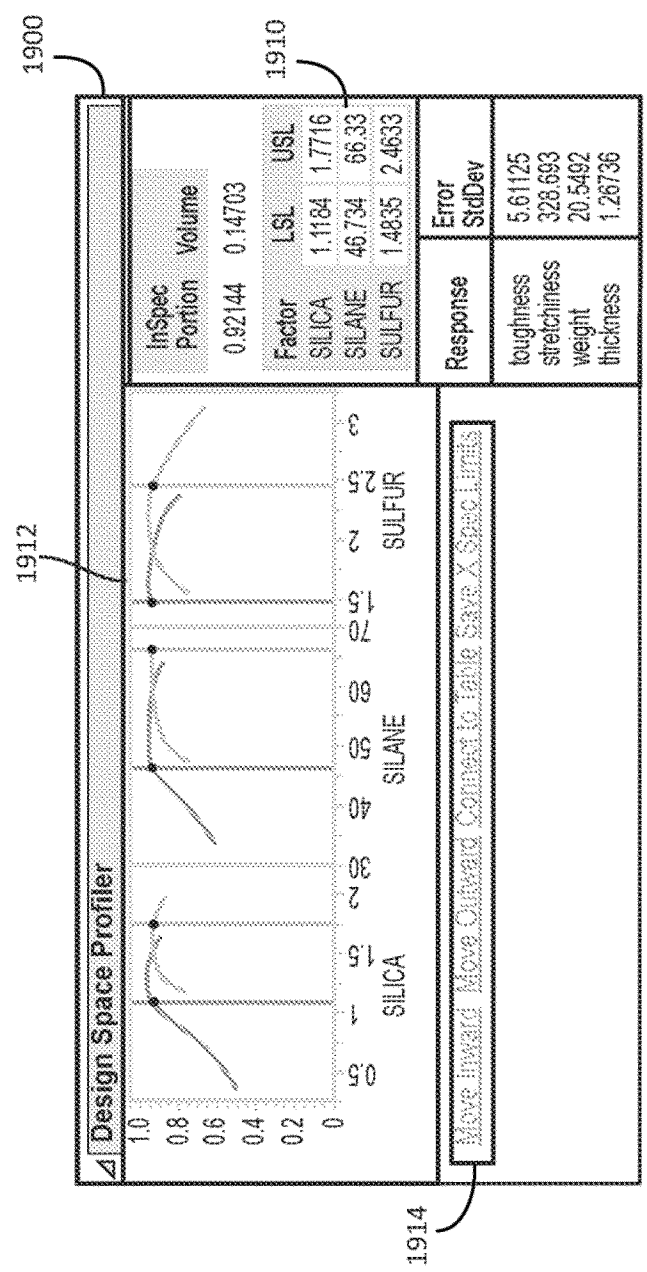
FIGS. 7A-C illustrate a graphical user interface for volume representations for input and output variables in at least one embodiment of the present technology.
Figures 7B, 7C:
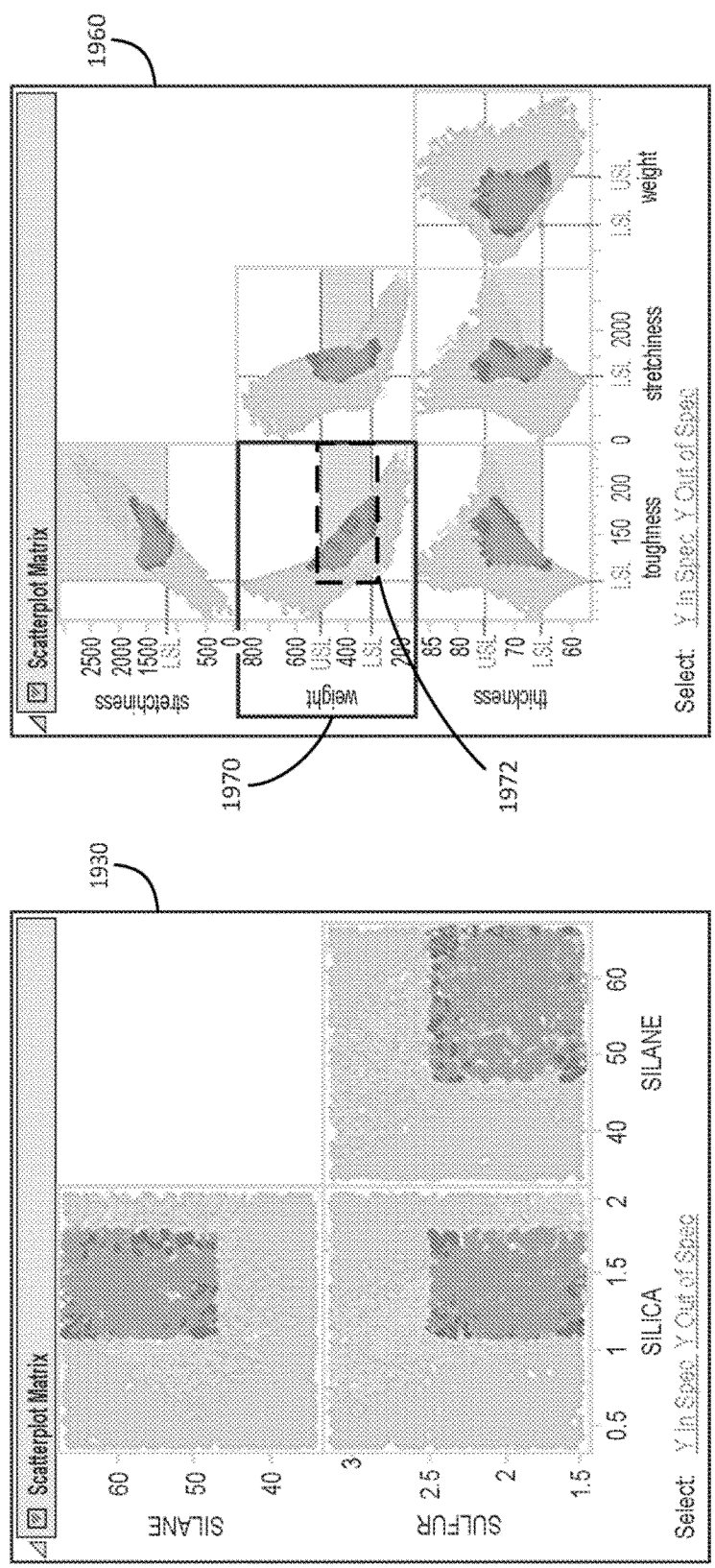
Figure 9A:
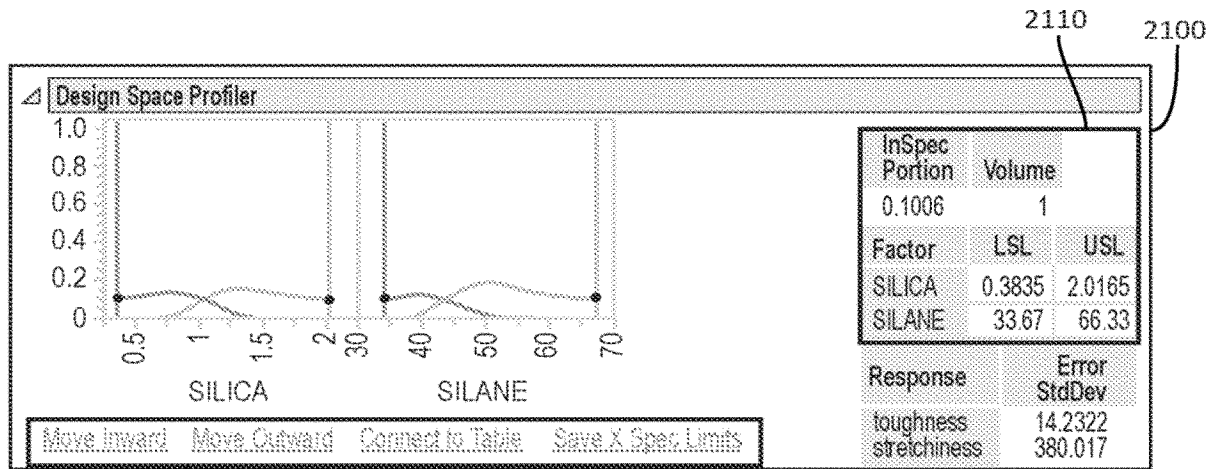
Figure 9B:
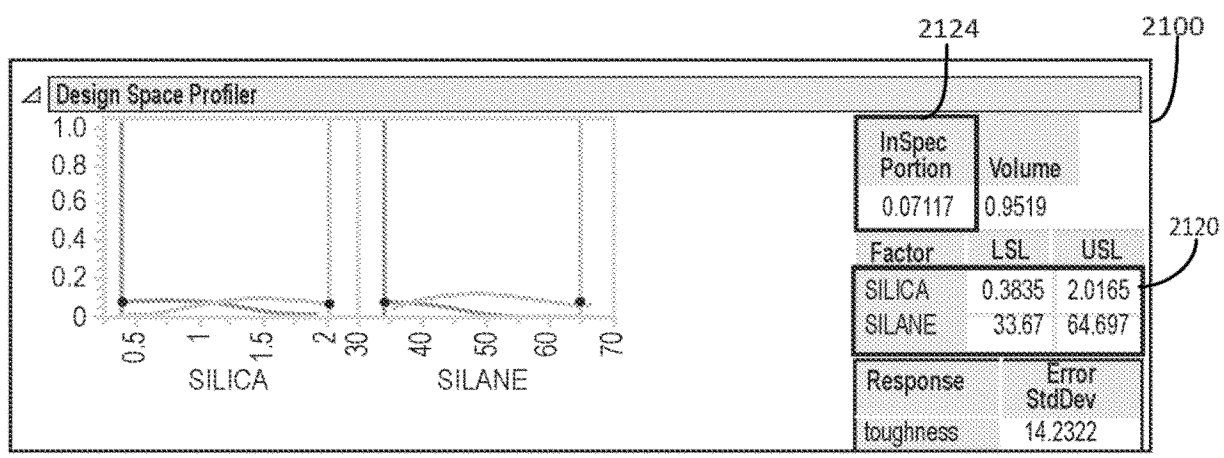
Figure 9C:
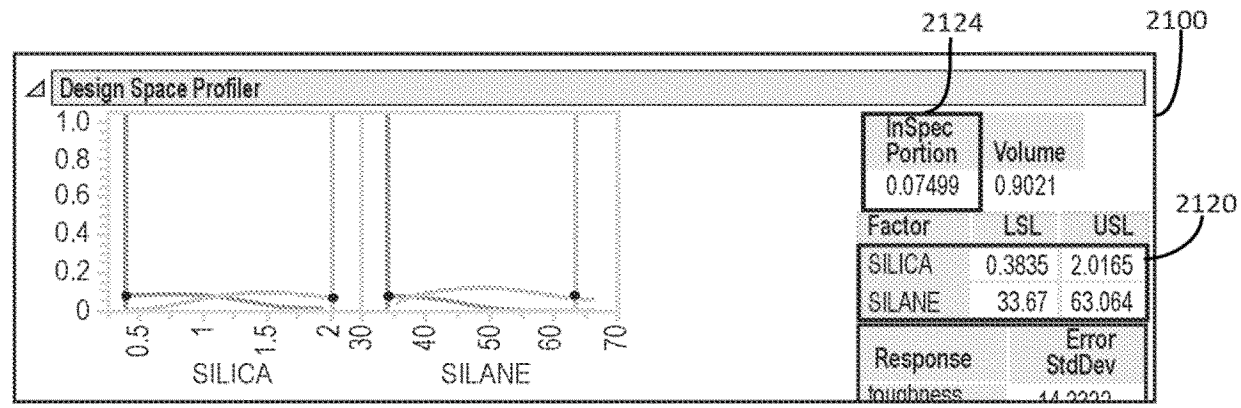
Figure 10A:
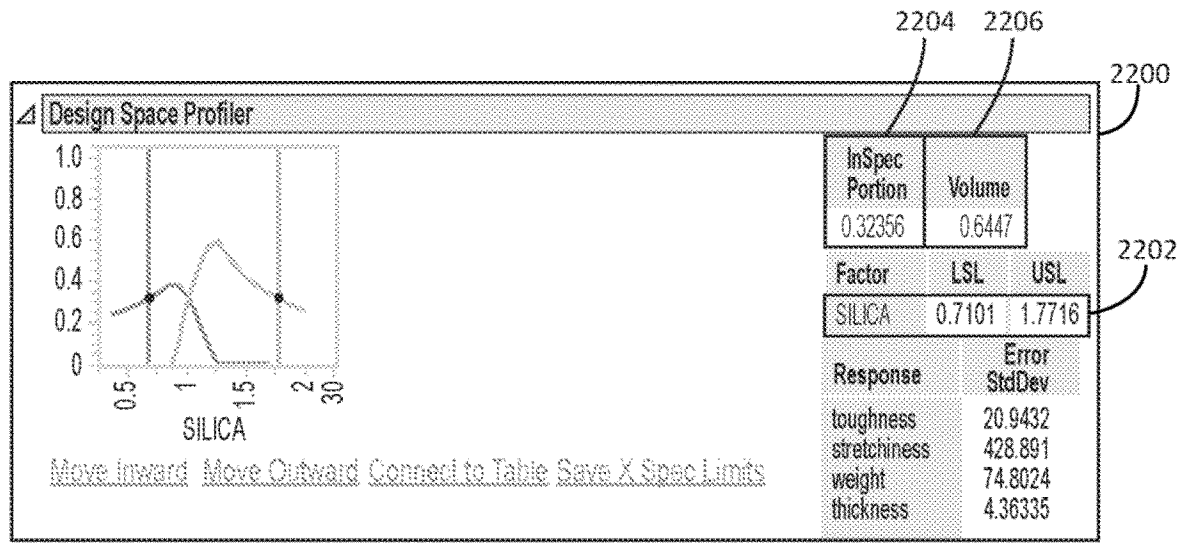
Figure 10B:
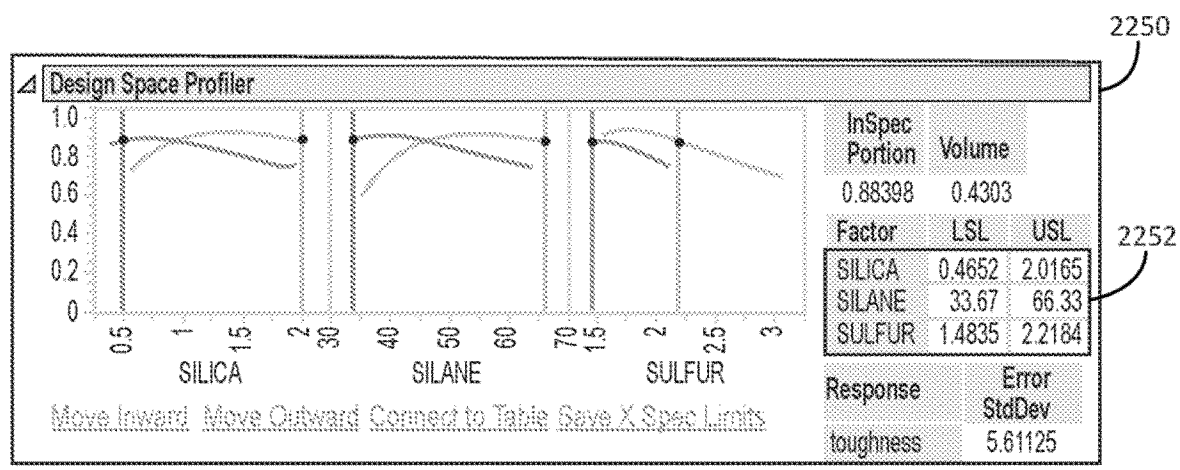
Figure 11:
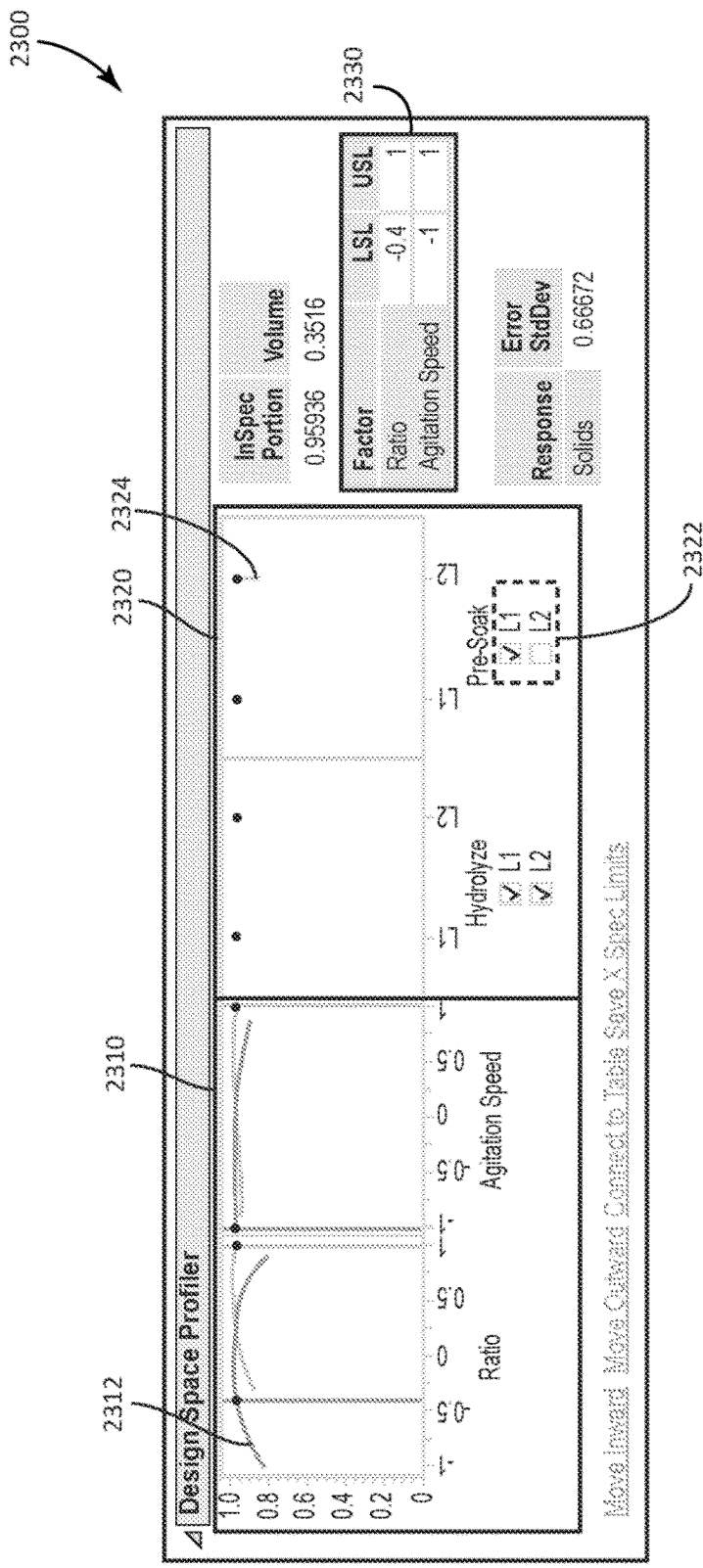
Figure 12A:
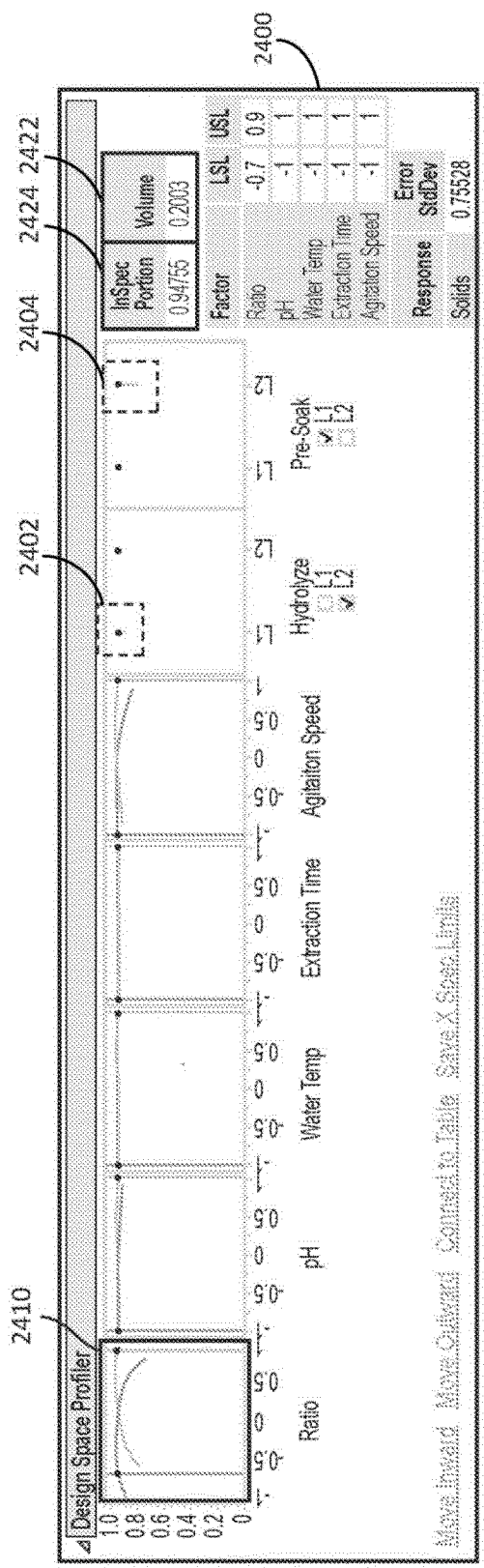
Figure 12B:
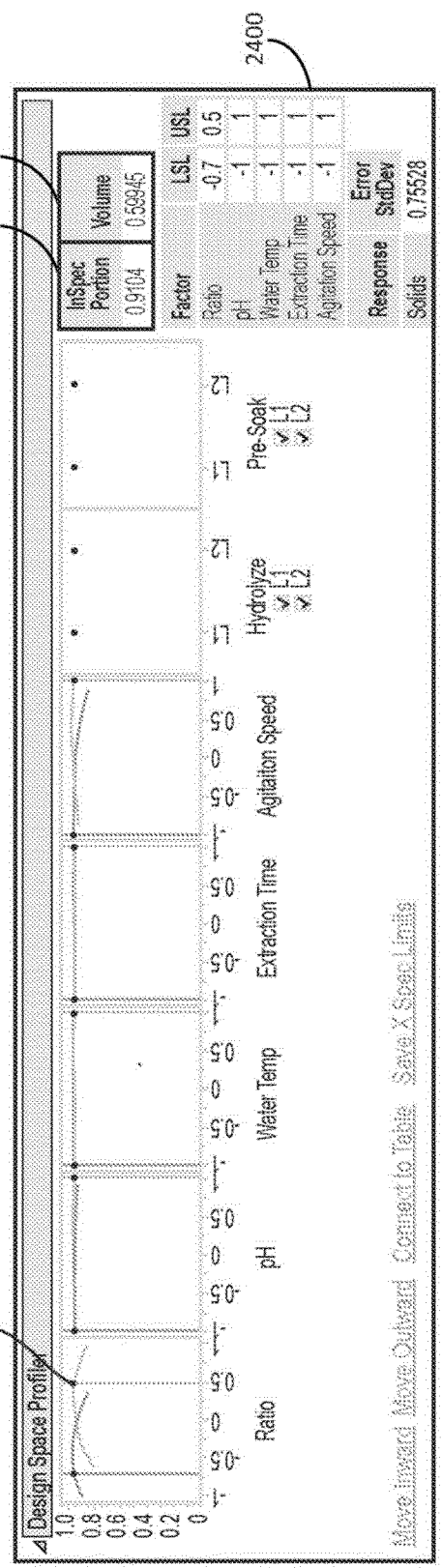
Figure 13A:
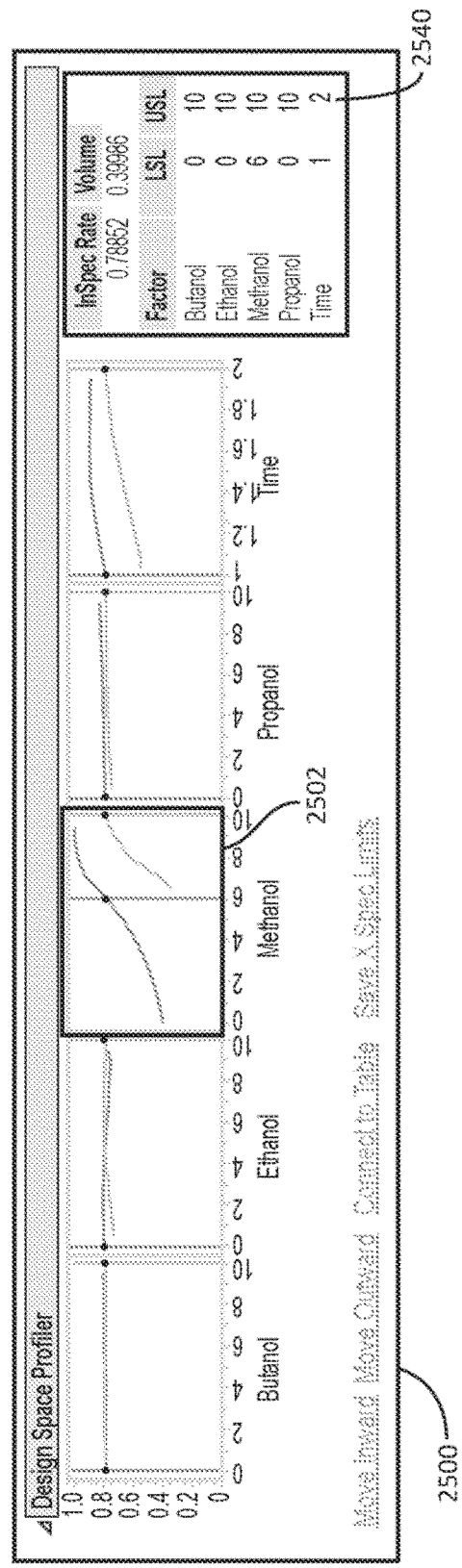
Figure 14:
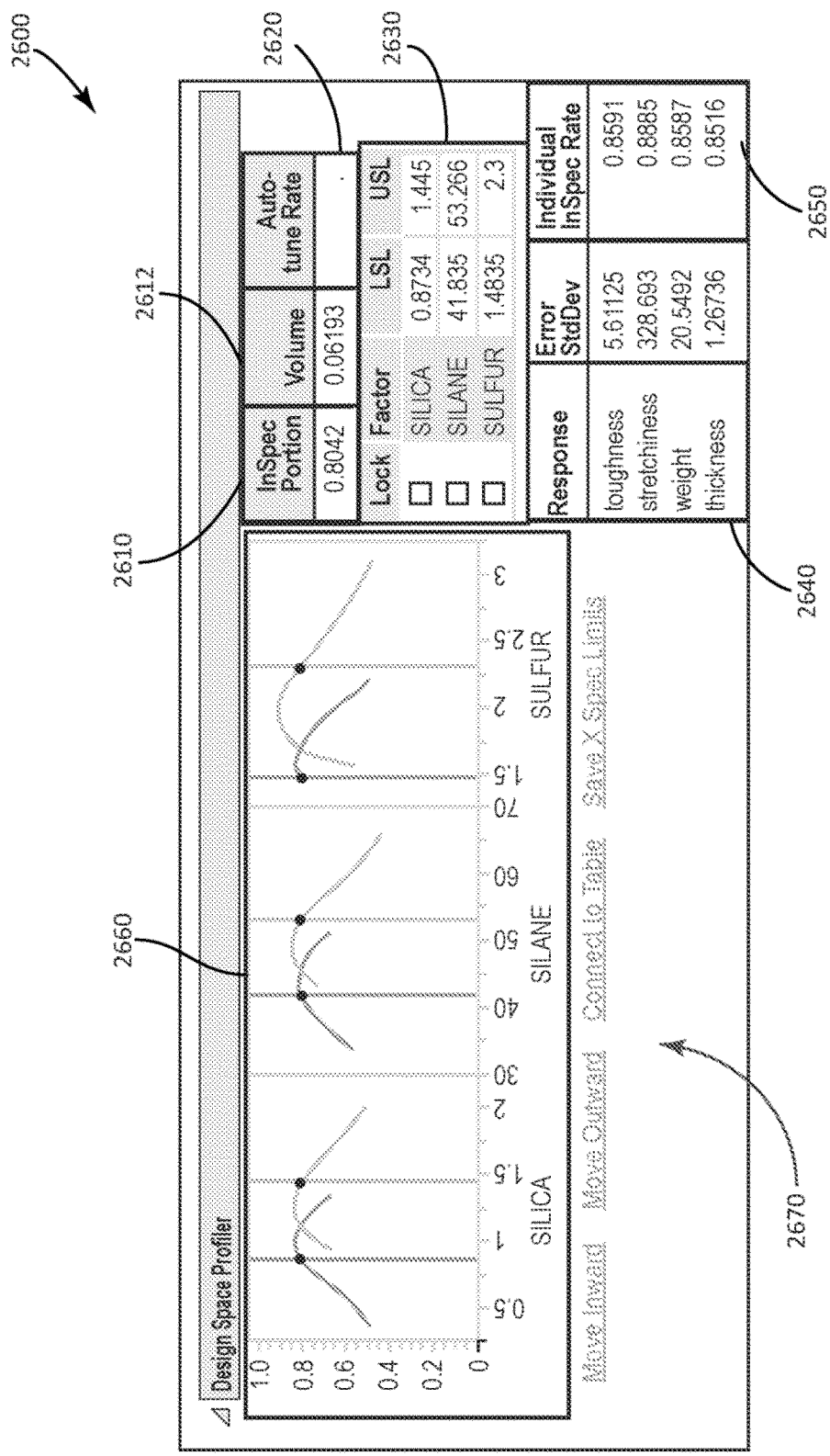

It can also be helpful to have visualizations for what output responses are included or excluded. FIGS. 7A-C illustrate portions of a graphical user interface for volume representations for input and output variables. FIG. 7A shows a portion 1900 of an interactive graphical user interface with features, fields, and controls, the same as, or similar to, graphical user interfaces shown in FIGS. 5A-D and FIGS. 6A-D. For instance, FIG. 7A comprises graphs 1912, table 1910, and controls 1914. FIG. 7B shows a graphical representation 1930 with scatter plots showing included and excluded data points with respect to input variables, similar to scatter plots shown and described with respect to FIGS. 6B and 6D.

Additionally, FIG. 7C shows a graphical representation 1960 of included and excluded data points based on output responses. With this graphical representation, specification information can be additionally shown with respect to the data points. For instance, graph 1970 shows that there is a lower bound for weight at 300 pounds and an upper bound at 500 pounds. Under the specification tires cannot be sold that are more than 500 pounds or less than 300 pounds. Graph 1970 also shows there is a lower bound of 100 for toughness. An in-specification area (e.g., in-specification area 1972) as defined by the different specification limits can be colored. In this example, in-specification area 1972 is colored a light green, showing a rectangular area in graph 1970. Data points considered in the distribution can also be plotted showing points that were in- and out-of-specification considering all the specifications (e.g., also the lower bound for stretchiness). By providing this information the user can determine which adjustments to make for output responses that can be of greater interest to the user to ensure that they are in-specification, even if the overall in-specification rate stays the same or reduces.

Additionally, control bar 1914 allows a user to select a "Connect to Table" option. This way the user can see a listing of the options for data points (e.g., levels or numeric values assigned) and whether they are in- or out-of-specification in a tabular form.

FIG. 8 illustrates a graphical user interface 2000 of predicted in-specification and out-of-specification output responses in a tabular form. Rows comprising a green circle are rows associated with data points where the predicted response values are all within specification limits. Rows comprising a red circle are rows associated with data points where at least one of the predicted response values fall outside of the specification limits. In this example, Rows 2 and 4 have green circles because one or more predicted responses are within the specification limits. Rows 1 and 3 have red circles because the one or more predicted responses are outside of the specification. Other information could be displayed. For instance, a response could be marked as important or dominant (e.g., with a different shape or by highlighting the whole row in a color). For example, a row could be used to show data points that have pass or fail rates for important responses in a situation where the in-specification rate is a cumulative rate for passing all specifications (e.g., a triangle could be used to show cases where the data point was outside the specification, but inside the specification for the important response).

By providing the user different forms and ways to explore the generated data points the user can have greater information for interacting with the interactive graphical user interface to adjust bounds for candidate options for the input variables.

Figure 9A:
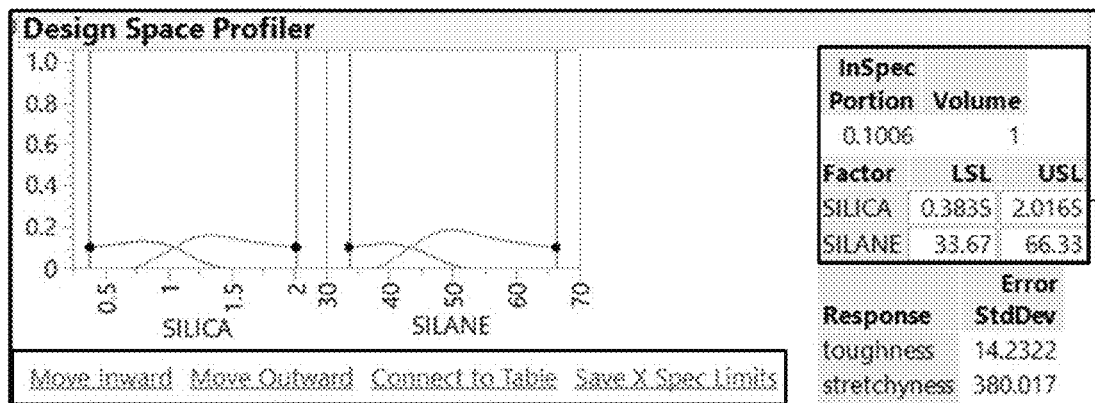
FIGS. 9A-C illustrate graphical user interfaces for incrementally changing a specification rate in at least one embodiment of the present technology.
Figure 9B:
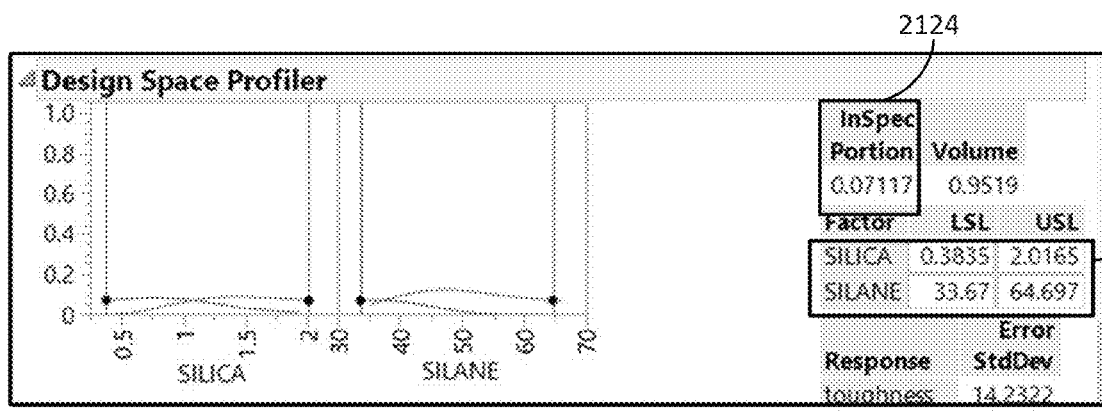
Figure 9C:
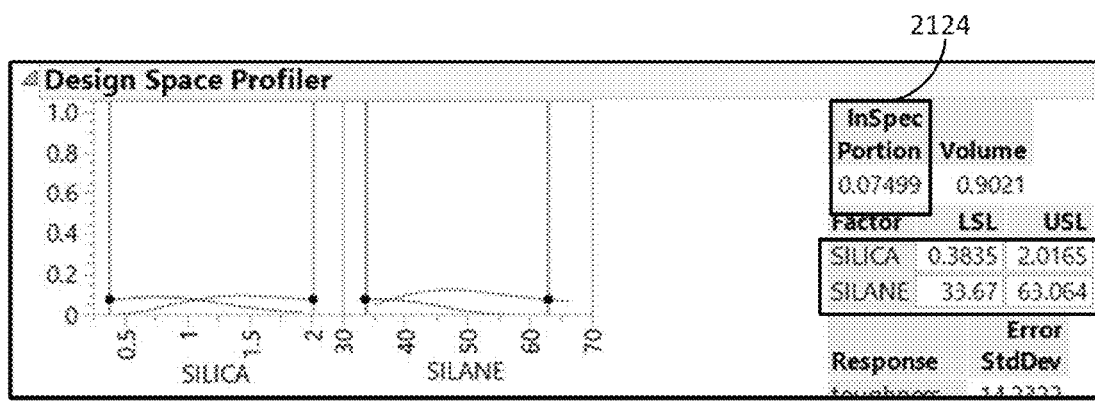

In some situations, however, a user can simply want to improve an in-specification rate and may not be as concerned about including or excluding certain data points. In this situation, controls can be used to incrementally improve the specification rate. FIGS. 9A-C illustrate graphical user interfaces for incrementally changing the specification rate. FIG. 9A shows a graphical user interface 2100 with controls 2114. Controls 2114 have a "Move Inward" option and a "Move Outward" option. If the user selects either of these options, the computing system can receive the user indication to change the set bound of the one or more bounds by changing the generated specification rate autonomously from user selection of a particular bound for the one or more input variables. A single limit bound may be narrowed towards the other bound a certain delta each time the user selects "Move Inward" or increased towards a maximum possible bound each time the user selects "Move Outward". The computing system can generate a computer selection of a selected bound for a given input variable of the one or more input variables, and determine an updated setting based on the computer selection (e.g., a setting in table 2110 for an updated bound, in-specification rate, or volume).

In this example in FIGS. 9A-9C, the graphical user interface 2100 starts with default limits at [0.3835, 2.0165] for Silica and [33.67, 66.33] for Silane because those are the original ranges of data used in generating the model. The computing system defines a grid of potential specification limit values for silica equally spaced between 0.3835 and 2.0165. In this example, there are 21 total grid points including 0.3835 and 2.0165, but other amounts could be used. The grid points include the set {0.3835, 0.3835+ 0.06248, 0.3835+2*.06248, 0.3835+3*.06248, . . . , 0.3835+ 19*.06248, 2.0165}. Each grid point adds delta_silica=0.06248=(2.0165−0.3835)/20 to the previous grid point.

Similarly, the computing system generates a grid of values for silane. Here delta_silane=(66.33−33.67)/20=1.63. The grid of potential specification limits for silane is {33.67, 33.67+1.63, 33.67+2*1.63, . . . , 66.33}.

In FIG. 9A, the user selects the "Move Inward" option button. The current limits for silica and silane are [L_silica, U_silica] and [L_silane, U_silane]. The computing system tries out 4 sets of limits and determines what the portion in specification would be based on the simulation predictions. The 4 scenarios are:

(1) [L_silica+delta_silica, U_silica], [L_silane, U_silane];
(2) [L_silica, U_silica-delta_silica], [L_silane, U_silane];
(3) [L_silica, U_silica], [L_silane+delta_silane, U_silane]; and
(4) [L_silica, U_silica], [L_silane, U_silane-delta_silane].

The computing system determines which of those scenarios indicates the largest portion of simulated responses in specification and selects a bound based on that scenario. In other words, the computing system shrinks the limits by size delta for each factor which means either increasing the lower limit or decreasing the upper limit.

When the user selects the "Move Inward" option from the original limits in FIG. 9A, the best move according to the computing system is to decrease the upper limit of silane by delta_silane=1.63. FIG. 9B shows the graphical user interface 2100 updated for the new limits 2120. The new limits 2120 for silane will be [33.67, 66.33−1.63] or [33.67, 64.697] in FIG. 9B. The limits for silica did not change. It should be noted that this reduced the overall portion of in-specification products from 0.1006 to 0.07117 as shown in in-specification field 2124. However, it also reduced the volume from 1 to 0.9519.

FIG. 9C shows the graphical user interface 2100, if the user selects press the "Move Inward" option again, the computing system determines the best move is to decrease the upper limit of silane again. This time the new limits 2120 for silane will be [33.67, 64.7–1.63] or [33.67, 63.064]. This time the in-specification portion improved slightly from 0.07117 to 0.07499 in in-specification field 2124. In this way the user can interact with the graphical user interface to find the user desired balance between volume and specification rate. By allowing the computing system to autonomously control the changed bounds, this can reduce the burden on the user while still allowing the user control over the ultimate balance.

This example in FIGS. 9A-9C showed the "Move Inward" option. An analogous process occurs if the user had instead selected the "Move Outward" option. In this situation the user indicates to increase the width of each set of limits by delta. If the current limits are [L_silica, U_silica] and [L_silane, U_silane], the four attempts are:

(1) [L_silica-delta_silica, U_silica], [L_silane, U_silane];
(2) [L_silica, U_silica+delta_silica], [L_silane, U_silane];
(3) [L_silica, U_silica], [L_silane-delta_silane, U_silane]; and
(4) [L_silica, U_silica], [L_silane, U_silane+delta_silane]

Whichever of those four moves provides the highest resulting in specification portion is the move that the computing system determines. There are other ways to move these limits inward and outward. One way would be to fit a classification tree to the results of a Monte Carlo simulation. The computing system could model the binary outcome of whether or not the simulated responses are within specification using the experimental factors (e.g., silica and silane) as predictors. Then the moving inward and outward could be guided using optimal splits from the classification tree. One of ordinary skill in the art will appreciate other ways the computing system could incrementally adjust the bounds autonomously from the user having to specify the adjusted bounds (e.g., other techniques for predicting changes to the specification rate to select a next incremental move).

Figure 10A:
FIG. 10A illustrates a graphical user interface of an example single factor analyzed in at least one embodiment of the present technology

Examples used herein have multiple input variables and output variables to show that embodiments can handle complex situations. However, embodiments are also useful in more simplistic scenarios. FIG. 10A illustrates a graphical user interface 2200 of an example single factor analyzed. This can still be useful, for instance, for moving the bounds 2202 of a single input variable to determine a balance between in-specification rate 2204 and volume in volume field 2206. This is particularly true in this example where there are specifications for multiple output responses considered.

Figure 10B:
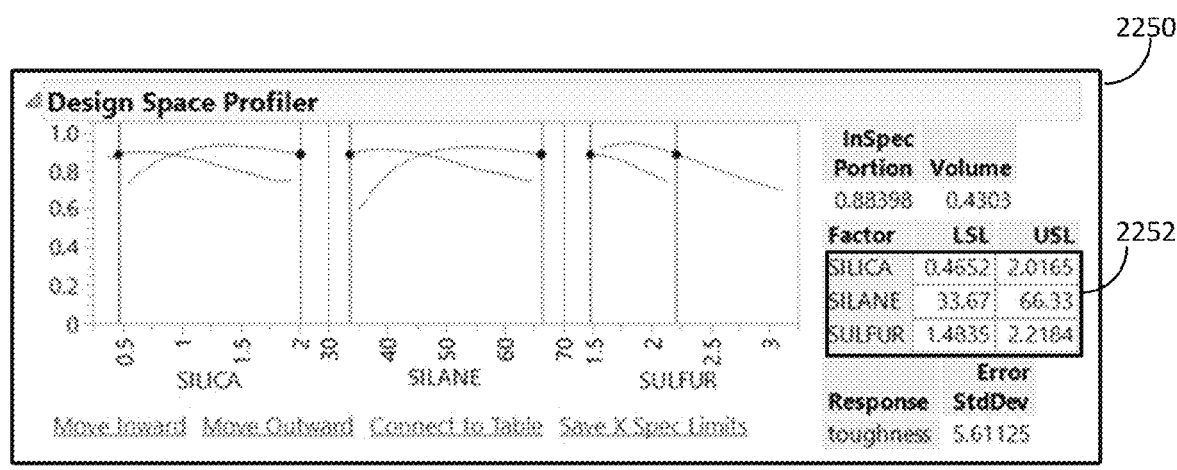
FIG. 10B illustrates a graphical user interface of an example single output type analyzed in at least one embodiment of the present technology

FIG. 10B illustrates a graphical user interface 2250 of an example single output type analyzed but multiple input variables. This can be useful for, for instance, for visualizing which bounds 2252 to adjust for a tradeoff in volume to in-specification rate.

Embodiments have shown input variables that are continuous variables merely for example. Embodiments are equally applicable to other types of input variables (e.g., categorical factors).

Figure 11:
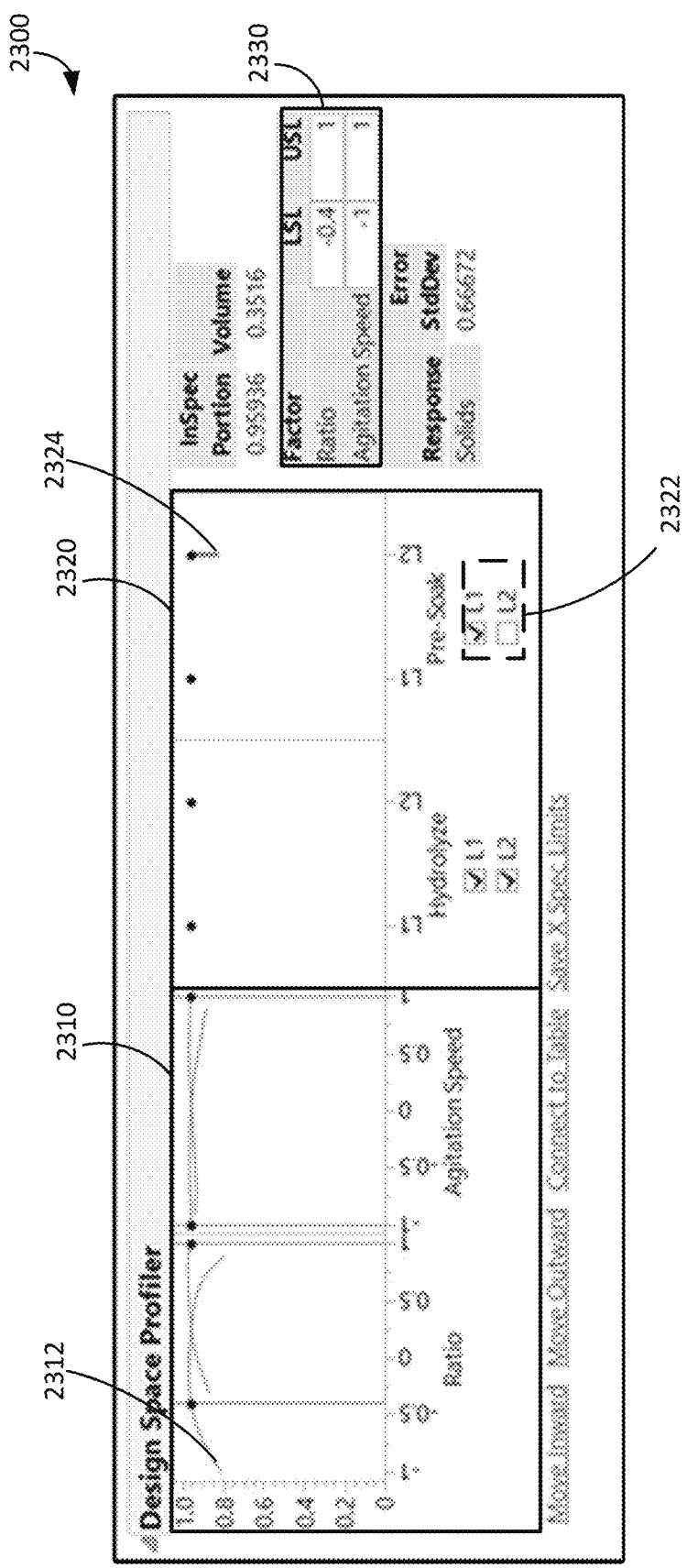
FIG. 11 illustrates a graphical user interface with continuous and categorical factors in at least one embodiment of the present technology.

FIG. 11 illustrates a graphical user interface 2300 with continuous and categorical factors. The data for generating the model is fictional data regarding a peanut manufacturing process from JMP® sample data. This example experiment involves two continuous factors (ratio and agitation speed) and two categorical factors (hydrolyze and pre-soak options).

Each of graphs 2310 and 2320 represent, for a given input variable of multiple input variables, an association between predictions for the candidate specification rates and a given bound for candidate options for the given input variable. In graphs 2320 a given input variable comprises categorical factors, and the graphs 2320 show multiple levels for candidate options for the categorical factor. For instance, the pre-soak variable has levels 2322. In the example in FIG. 11, the computing system displays relative correlations for particular levels of the multiple levels based on a length of a categorical visual indicator at each of the levels in the at least one graph. For example, a line 2324 is shown going downward from the level 2 option to show that if level 2 were selected then it would decrease the in-specification rate.

In graphs 2310 a given input variable comprises continuous factors with candidate options in one or more ranges. For instance, the factors have bounds set in settings 2330. The computing system displays relative correlations for particular options based on a gradient of a continuous visual indicator within the one or more ranges. For instance, the curve 2312 shown in blue has a steep gradient on the ends indicating that if the lower bound were moved to one of those extremes the in-specification rate is predicted to decrease.

The user can also set bounds for the categorical factor as with a continuous factor. Instead of specification limits, the user restricts the categorical variable by unchecking one or more of the levels. When at least one level is checked, the graph can show with a vertical line how the current in-specification rate would change if the checkbox was changed for that level.

In this example, using the graph of the predicted in-specification rates, the user can visualize that the best way to improve the response in-specification rate is to put upper specification limits on the factor Ratio given the steeper gradient on Ratio, and to limit the Pre-soak factor to just one level, L1, as including the L2 option for the Pre-soak factor would greatly decrease the in-specification rate given the line 2324.

Figure 12A:
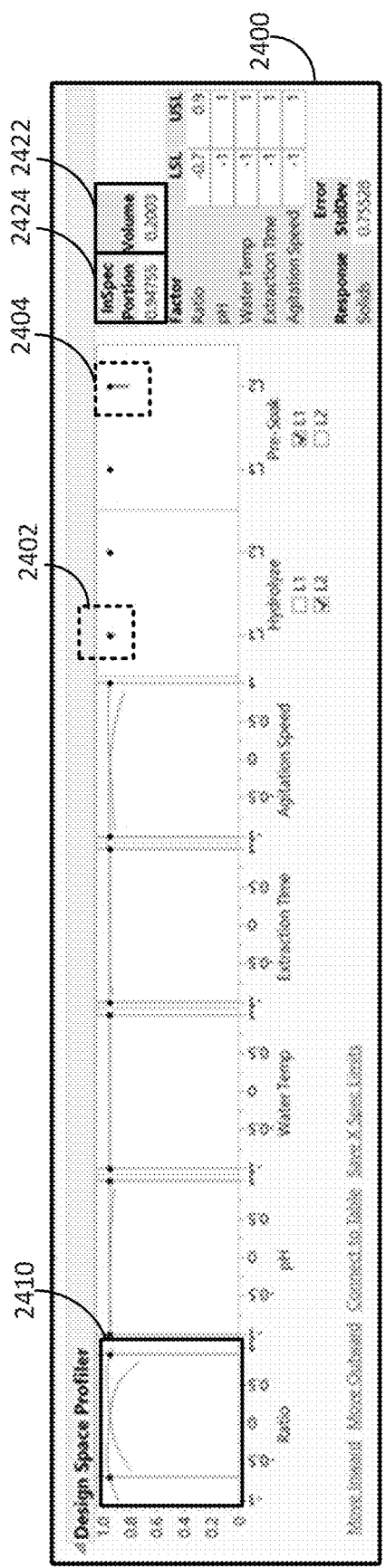
FIGS. 12A-B illustrate a graphical user interface for changing bounds for categorical and continuous factors in at least one embodiment of the present technology.
Figure 12B:
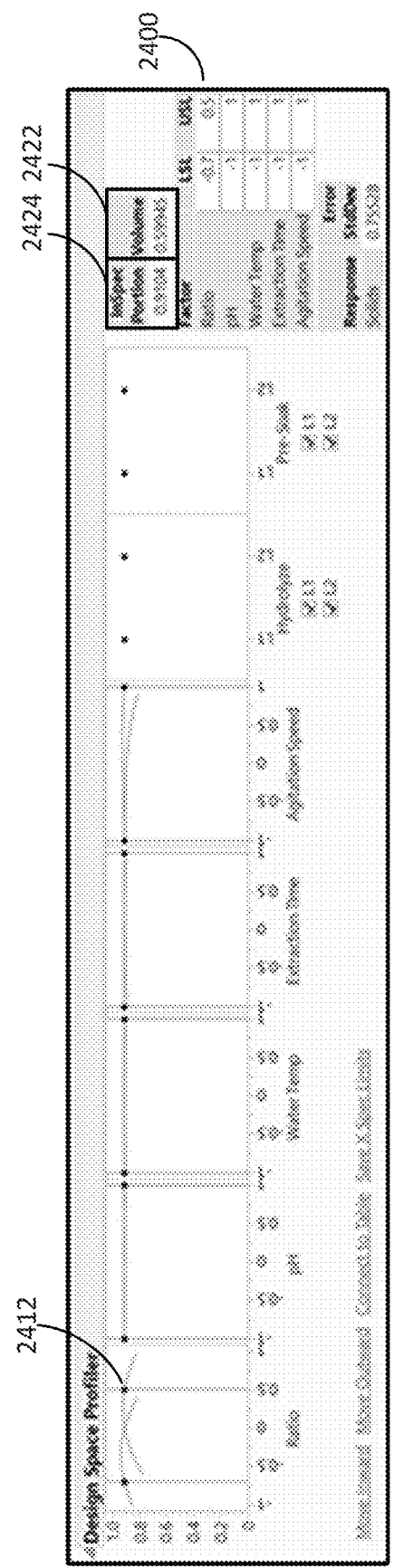

FIGS. 12A-B illustrate a graphical user interface 2400 for changing bounds for categorical and continuous factors. In the example shown in FIG. 12A there are 5 continuous factors (Ratio, pH, Water Temperature, Extraction Time, and Agitation Speed) and two categorical factors (Hydrolyze and Pre-soak) for a peanut manufacturing process. In FIG. 12A, currently only one level is checked for each of the categorical factors. However, a small green line is shown in area 2402 for the L1 option for the Hydrolyze factor showing that the in-specification rate would decrease slightly if L1 were checked. A slightly longer green line is shown in areas 2404 for the L2 option for the Pre-Soak option, showing the in-specification rate would decrease if L2 were checked. A user can consider this information and can decide that the significant increase in volume for including an option can outweigh the slight decrease in in-specification.

In the example, in FIG. 12A, the in-specification field 2424 shows a high in-specification portion of 0.94755 or approximately 95% of all the peanuts are in-specification. However, the volume field 2422 shows that only 0.2003 or 20% of the total volume of options are considered. In cell 2410 the user can also observe on the upper bound that there is not much change for the predicted in-specification rate if the user decreases the range of options for Ratio by lowering the upper bound. The user can decide it would be advantageous to narrow options for this processing factor.

FIG. 12B shows the results from the user moving the marker 2412 to lower the upper bound in cell 2410 and include all the possible levels for the Hydrolyze and Pre-Soak factors. As shown in the in-specification field, the changes made little change to the specification rate (0.9104 portion or 91 percent of products) but the volume of options significantly increased to 0.59945 in the volume field 2422.

In one or more embodiments, an interactive graphical user interface (e.g., interactive graphical user interface 2400) allows a user to visualize tradeoffs in volume and in-specification rate and make decisions for upper and lower bounds for options for factors in an experiment or process.

In one or more embodiments, an interactive graphical user interface can be used for the user to set certain auto-tune goals and allow the computing system to autonomously change bounds.

Figure 13A:
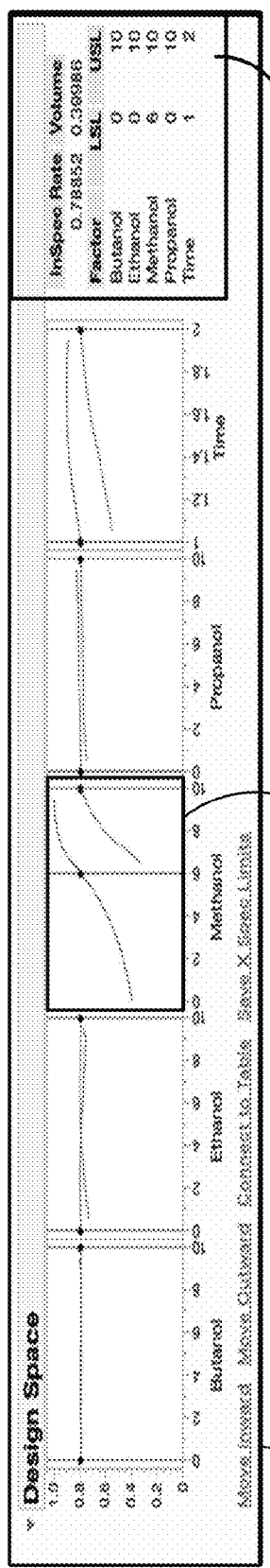
FIG. 13A illustrates a graphical user interface with a steep gradient in at least one embodiment of the present technology.

FIG. 13A illustrates a graphical user interface 2500 based on Extraction Data, which is a fictional data from JMP® sample data. The Extraction Data set 2540 includes five continuous factors related to product materials (Butanol, Ethanol, Methanol, Propanol) and a processing constraint (time). Using the graphical user interface 2500, the user can visualize that Methanol is much more important than the other factors in improving specification rate because there is a steep gradient in cell 2502 with the graph for Methanol. Therefore, the user has moved the lower bound in graphical user interface 2500 to 6. In narrowing the specification range for that factor there is an improvement in the in-specification rate. However, the gradient for the other factors is less pronounced making it more difficult for the user to decide which other ranges to change to increase the specification rate.

In one or more embodiments, a computing system receives updated settings based on the user indication to change a set bound of the one or more bounds by increasing the generated specification rate autonomously from user selection of a change for a given bound of the one or more input variables.

Figure 13B:
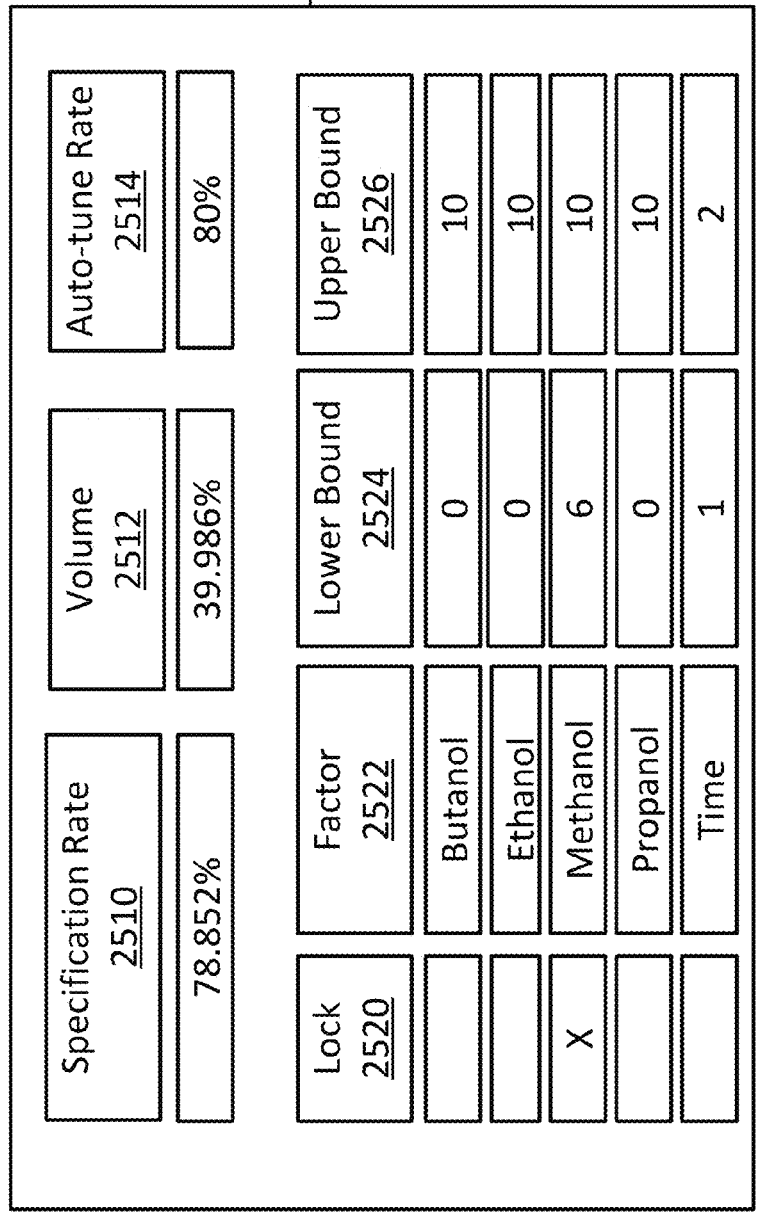
FIG. 13B illustrates a graphical user interface with auto-tuning of specification rate and locking of bounds for factors in at least one embodiment of the present technology.

For example, FIG. 13B illustrates graphical user interface options 2550 with auto-tuning of specification rate and locking of bounds for factors. In FIG. 13B, the user can use lock options 2520 to lock a factor so that the computing system will not consider adjusting bounds of a locked factor. For instance, in this example, the user has locked the methanol factor because the user has already decided the tradeoffs for the lower bound and upper bound using the cell 2502.

The current specification rate field 2510 shows a specification rate of 78.852% and a volume field 2512 shows a current volume of 39.986%. The user can use the auto-tune rate field 2514 to set a target specification rate (e.g., of 80%). The computing system can determine, from a graphing of predicted specification rates, the updated specification rate with a steepest prediction gradient around a given bound of the one or more input variables (even though this can be difficult for the user to visually discern or manually adjust because of slight variations in the gradient). The computing system can autonomously adjust the generated specification rate to the updated specification rate.

In this example, the computing system receives the user indication to change the set bound of the bounds to increase the generated specification rate from 78% to 80% autonomously from user selection of a particular bound for the input variables. The computing system determines, from a graphing of predicted specification rates, the updated specification rate with a steepest prediction upward gradient around a given bound of the input variables. The computing system autonomously adjusts the given bound to increase the generated specification rate according to the user indication. For instance, as explained with respect to FIGS. 9A-9C the computing system can look at the predicted specification rates a set delta away from current settings to find a new move that best improves the in-specification rate.

For instance, in one or more embodiments the computing system receives the user indication to change a set bound (e.g., a lower bound 2524 or upper bound 2526 for a factor 2522) to increase or decrease the generated specification rate autonomously from user selection of a particular bound for the input variables. The computing system generates a computer selection of a selected bound for a given input variable of the input variables that increases or decreases the generated specification rate according to the user indication. The computing system determines the updated setting based on incremental bound computer selections until a change limit is reached. For instance, the change limit can be set based on one or more of: a processing constraint (e.g., to process for 30 seconds); a defined quantity of increments (e.g., to move only N deltas); and a user indication of a target specification rate (e.g., auto-tune rate field 2514).

It is possible that the user can specify to set a lower specification rate to increase the volume (e.g., the user could have set the auto-tune rate field 2514 to 75%). In this case, the computing system receives a user indication to change the set bound of the bounds to decrease the specification rate autonomously from user selection of a particular bound for the input variables. The computing system can determine, from a graphing of predicted specification rates, the updated specification rate with a steepest downward prediction gradient around a given bound of the input variables and autonomously adjust the given bound to decrease the generated specification rate according to the user indication. The computing system can look at the predicted specification rates a set delta away from current settings to find the desired specification rate. If more than one move would decrease the specification rate, the computing system can make the move that best increases the volume. In other examples, the graphical user interface can present options for the user to lock the volume or indicate preference for increasing or decreasing the volume for the computing system to best know how to auto-tune the specification rate.

One of ordinary skill in the art will appreciate other options than shown here for indicating user preferences for the computing system to auto adjust trade-offs in the specification rate or volume (e.g., auto-tune volume fields, options for setting a change limit, locks on individual bounds, etc.).

In one or more embodiments, a computing system can display individual specification rates for individual output response (e.g., to aid a user in deciding which bounds to adjust or for auto-tuning of a specific output response).

Figure 14:
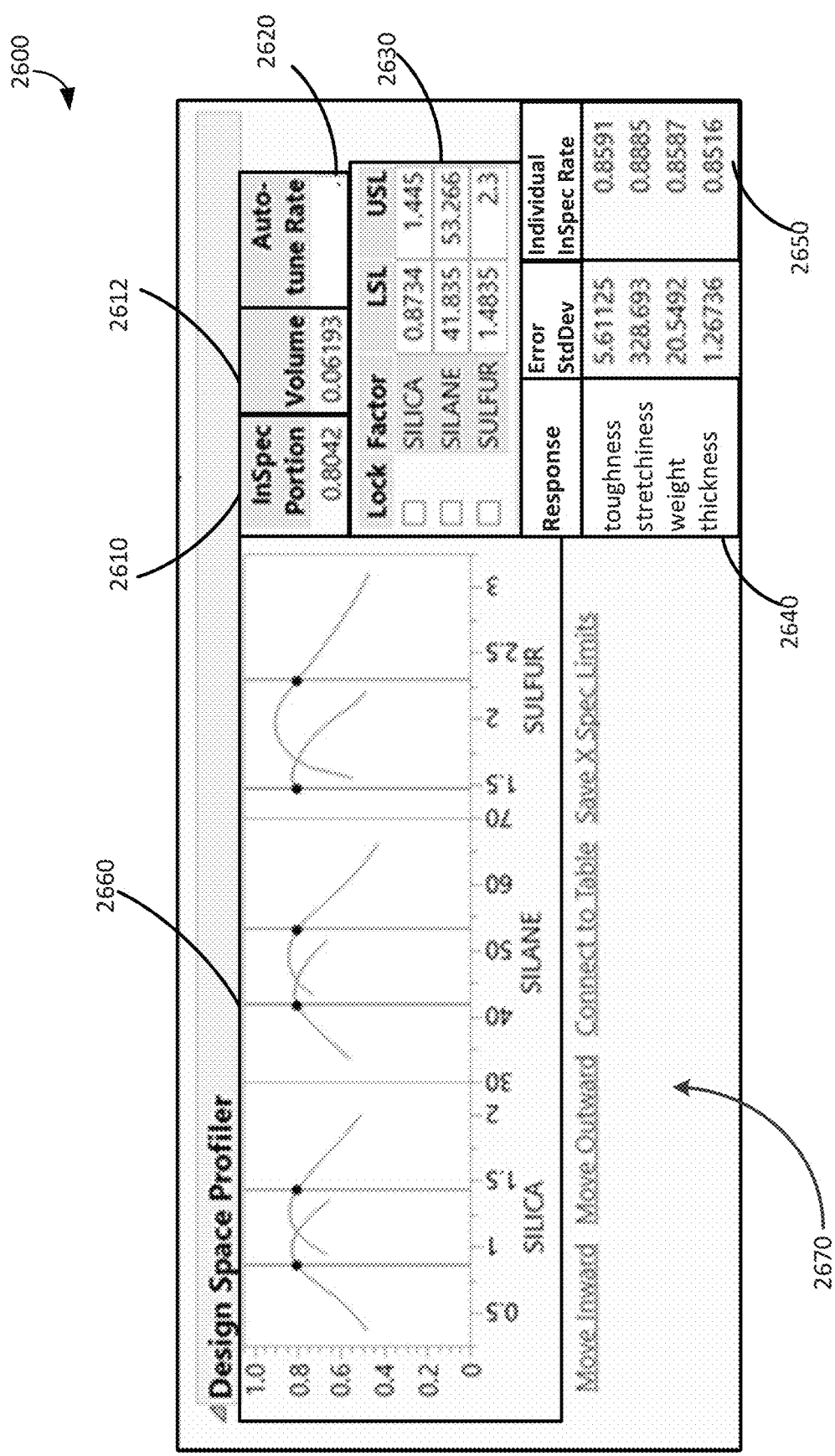
FIG. 14 illustrates a graphical user interface for individual specification rates in at least one embodiment of the present technology.
Figure 1:
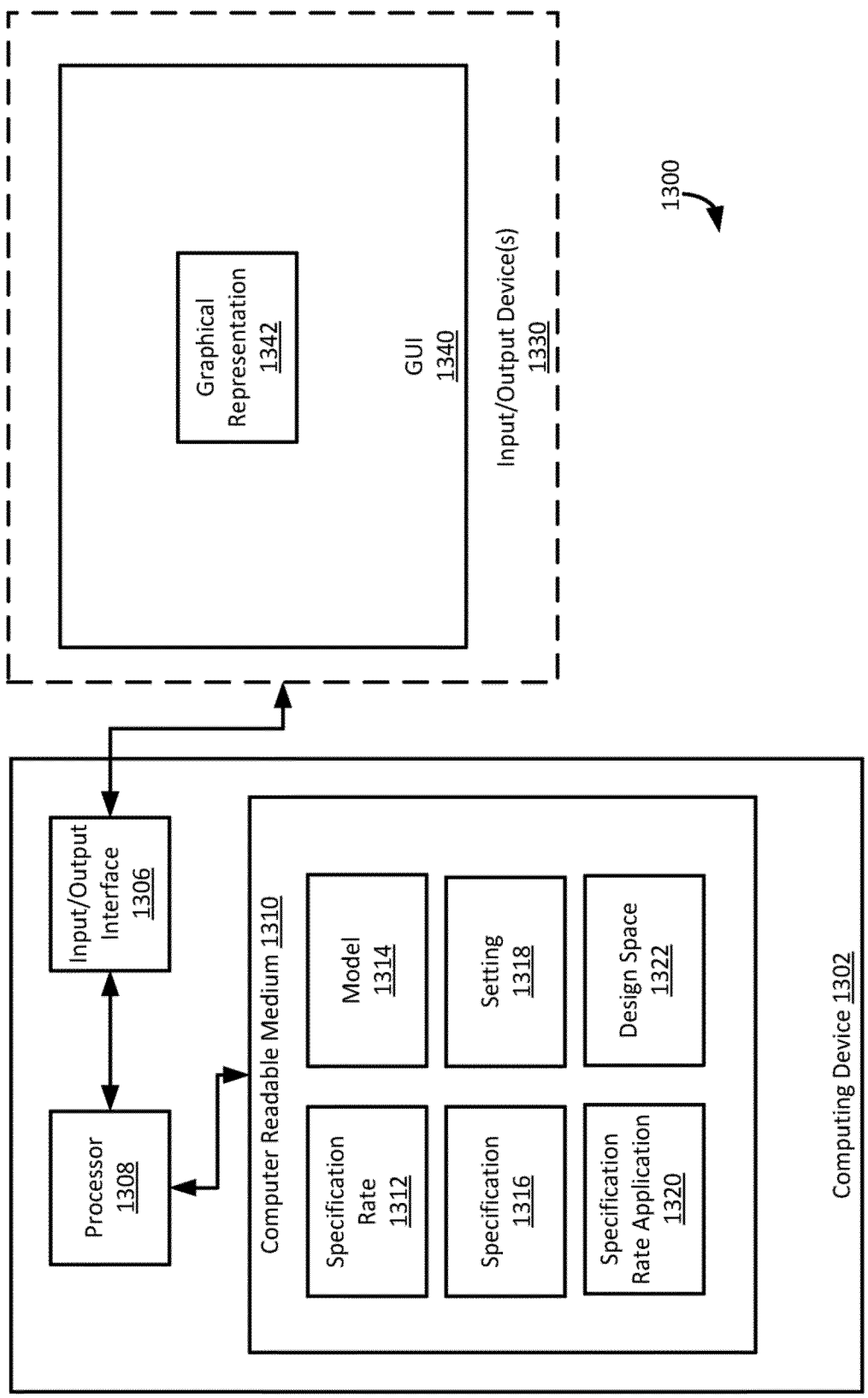
Figure 2:
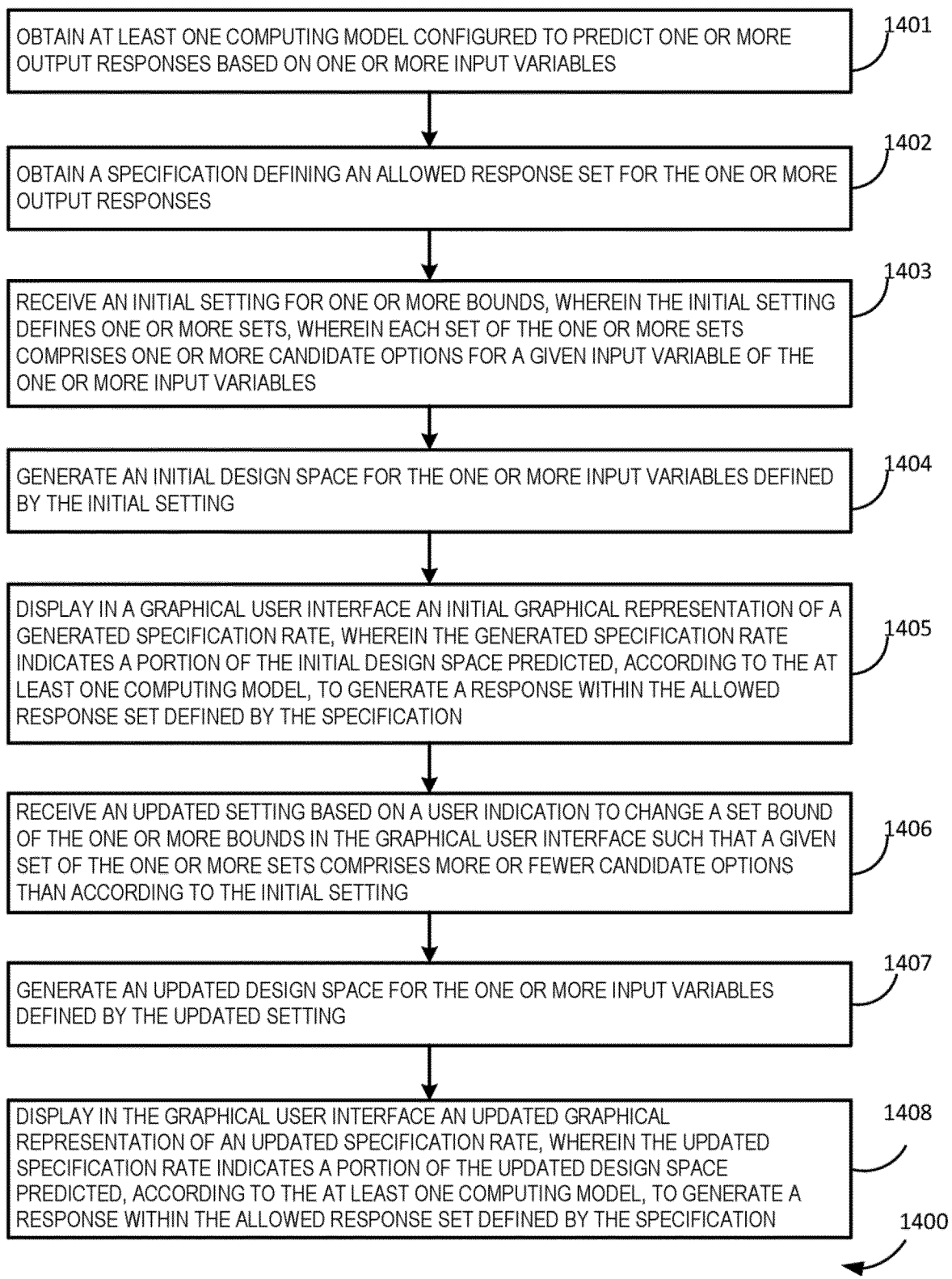

FIG. 14 illustrates a graphical user interface 2600 displaying individual specification rates 2650. In this example, there are multiple output response types 2640 (e.g., toughness, stretchiness, weight, and thickness). The computing system obtains a model by obtaining multiple predictive models, or a multi-output model, for multiple types of output response for the one or more output responses (e.g., using the graphical user interface 1500 in FIG. 3). The computing system obtains a specification by obtaining individual specifications each defining respective allowed response sets for each of the multiple types of output responses (e.g., using the graphical user interface 1600 in FIG. 4). Accordingly, a given set of candidate options for input variables (silica, silane, and sulfur) can result in different outcomes for whether a product is within specification for the different output responses.

FIG. 14 shows that the computing system displays in graphical user interface 2600 the initial graphical representation of the generated specification rate by displaying multiple specification rates 2650 corresponding to each of respective allowed response sets. As seen in FIG. 14, graphical user interface 2600 displays the in-specification field 2610, volume field 2612, and table 2630.

The user can then make changes to the bounds. For instance, the user can use interactive features in the graphical user interface 2600 to change markers for bounds in graphs 2660. Additionally, or alternatively, the user can use controls 2670 (e.g., "Move Inward" or "Move Outward" described herein) or use auto-tuning features described herein (e.g., auto-tune rate field 2620) to have the computing system autonomously change the bounds. The computing system can display in the graphical user interface 2600 an updated graphical representation of updated specification rate by displaying multiple specification rates corresponding to each of the respective allowed response sets as changed by the changed bounds.

In one or more embodiments, a user could set an auto-tune rate specifically for an individual specification rate as with the auto-tune rate field 2620 for the cumulative in-specification rate. Additionally, or alternatively, a user could set a lock on an individual specification rate as with locking factors for auto-tuning a cumulative specification rate.

One of ordinary skill in the art will appreciate other ways of providing an interactive graphical user interface that enables a user to visualize tradeoffs between predicted or forecasted in-specification rates, and other tools for altering those trade-offs such as by providing interactive bounds and auto-tuning of bounds based on the description herein.

What is claimed is:

1. A computer-program product tangibly embodied in a non-transitory machine-readable storage medium, the computer-program product including instructions operable to cause a computing system to:
    obtain at least one computing model configured to predict one or more output responses based on one or more input variables;
    obtain a specification defining an allowed response set for the one or more output responses;
    receive an initial setting for one or more bounds, wherein the initial setting defines one or more sets, and wherein each set of the one or more sets comprises one or more candidate options for a given input variable of the one or more input variables;
    generate an initial design space for the one or more input variables defined by the initial setting;
    display in a graphical user interface an initial graphical representation of a generated specification rate, wherein the generated specification rate indicates a portion of the initial design space predicted, according to the at least one computing model, to generate a response within the allowed response set defined by the specification;
    receive an updated setting based on a user indication to change a set bound of the one or more bounds in the graphical user interface such that a given set of the one or more sets comprises more or fewer candidate options than the initial setting;
    generate an updated design space for the one or more input variables defined by the updated setting; and
    display in the graphical user interface an updated graphical representation of an updated specification rate, wherein the updated specification rate indicates a portion of the updated design space predicted, according to the at least one computing model, to generate a response within the allowed response set defined by the specification.

2. The computer-program product of claim 1, wherein the instructions are operable to cause the computing system to:
    display the initial graphical representation by displaying at least one graph representing a related group of predicted specification rates, wherein individual predicted specification rates in the related group of predicted specification rates is responsive to changes to a set bound of the one or more bounds to increase or decrease candidate options of a given set of the one or more sets; and
    displaying the updated graphical representation by:
        updating the at least one graph to account for the user indication; and
        representing on the updated graphical representation an intersection of the related group of predicted specification rates with the set bound.

3. The computer-program product of claim 1, wherein the instructions are operable to cause the computing system to:
    generate predictions for candidate specification rates wherein the candidate specification rates each indicate a portion of a given design space predicted, according to the at least one computing model, to generate a response with the allowed response set defined by the specification;
    display the initial graphical representation by:
        displaying at least one graph representing, for a given input variable of the one or more input variables, an association between the predictions for the candidate specification rates and a given bound for candidate options for the given input variable; and
        displaying a marker on the at least one graph for the given bound; and
    wherein the user indication to change the set bound of the one or more bounds comprises moving the marker.

4. The computer-program product of claim 1, wherein the instructions are operable to cause the computing system to:
    generate predictions for candidate specification rates wherein the candidate specification rates each indicate a portion of a given design space predicted, according to the at least one computing model, to generate a response with the allowed response set defined by the specification;
    display the initial graphical representation by displaying at least one graph representing, for a given input variable of the one or more input variables, an association between the predictions for the candidate specification rates and a given bound for candidate options for the given input variable; and
    wherein when the given input variable comprises a categorical factor and the at least one graph shows multiple levels for candidate options for the categorical factor, display relative correlations for particular levels of the multiple levels based on a length of a categorical visual indicator at each of the levels in the at least one graph; and
    wherein when the given input variable comprises a continuous factor and the at least one graph shows candidate options in one or more ranges, display relative correlations for particular options in the at least one graph based on a gradient of a continuous visual indicator within the one or more ranges.

5. The computer-program product of claim 1, wherein the instructions are operable to cause the computing system to:

display the initial graphical representation of the generated specification rate by displaying a table indicating the generated specification rate; and display the updated graphical representation of the updated specification rate by updating the table.

6. The computer-program product of claim 1, wherein the instructions are operable to cause the computing system to receive the updated setting based on the user indication indicating to change the set bound of the one or more bounds by changing in the graphical user interface one or more of:
   a graphical representation of a set bound of the one or more bounds;
   a graphical representation of the generated specification rate;
   a graphical representation of an individual setting corresponding to a given input variable of the one or more input variables; and
   a cumulative setting for the one or more input variables.

7. The computer-program product of claim 1,
   wherein the instructions are operable to cause the computing system to further display one or more graphs indicating included and excluded candidate options for the one or more input variables; and
   wherein included candidate options are used for deriving the updated graphical representation of the updated specification rate and excluded candidate options are not used for deriving the updated graphical representation of the updated specification rate.

8. The computer-program product of claim 1, wherein the instructions are operable to cause the computing system to receive the updated setting by:
   receiving the user indication to change the set bound of the one or more bounds by changing the generated specification rate autonomously from user selection of a particular bound for the one or more input variables;
   generating a computer selection of a selected bound for a given input variable of the one or more input variables; and
   determining the updated setting based on the computer selection.

9. The computer-program product of claim 1, wherein the instructions are operable to cause the computing system to receive the updated setting by:
   receiving the user indication to change the set bound of the one or more bounds to increase the generated specification rate autonomously from user selection of a particular bound for the one or more input variables;
   determining, from a graphing of predicted specification rates, the updated specification rate with a steepest prediction upward gradient around a given bound of the one or more input variables; and
   autonomously adjusting the given bound to increase the generated specification rate according to the user indication.

10. The computer-program product of claim 1, wherein the instructions are operable to cause the computing system to receive the updated setting by:
    receiving the user indication to change the set bound of the one or more bounds to decrease the specification rate autonomously from user selection of a particular bound for the one or more input variables;
    determining, from a graphing of predicted specification rates, the updated specification rate with a steepest downward prediction gradient around a given bound of the one or more input variables; and
    autonomously adjusting the given bound to decrease the generated specification rate according to the user indication.

11. The computer-program product of claim 1, wherein the instructions are operable to cause the computing system to receive the updated setting by:
    receiving the user indication to change the set bound of the one or more bounds to increase or decrease the generated specification rate autonomously from user selection of a particular bound for the one or more input variables;
    generating a computer selection of a selected bound for a given input variable of the one or more input variables that increases or decreases the generated specification rate according to the user indication; and
    determining the updated setting based on incremental bound computer selections until a change limit is reached, wherein the change limit is set based on one or more of:
    a processing constraint;
    a defined quantity of increments; and
    a user indication of a target specification rate.

12. The computer-program product of claim 1, wherein the instructions are operable to cause the computing system to:
    obtain the at least one computing model by obtaining a predictive model predicting the one or more output responses according to settings for multiple different input variables of the one or more input variables, wherein the multiple different input variables comprise three or more input variables;
    display in the graphical user interface the initial graphical representation by displaying, in proximity to the specification rate, bounds for each of the multiple different input variables; and
    wherein the specification rate indicates a cumulative likelihood of being within the allowed response set accounting for the settings for the multiple different input variables of the one or more input variables.

13. The computer-program product of claim 1, wherein the instructions are operable to cause the computing system to:
    obtain the at least one computing model by obtaining multiple predictive models, or a multi-output model, for multiple types of output response for the one or more output responses; and
    obtain the specification by obtaining a cumulative specification defining an allowed response set for each of the multiple types of output responses.

14. The computer-program product of claim 1, wherein the instructions are operable to cause the computing system to:
    obtain the at least one computing model by obtaining multiple predictive models, or a multi-output model, for multiple types of output response for the one or more output responses;
    obtain the specification by obtaining individual specifications each defining respective allowed response sets for each of the multiple types of output responses;
    display in the graphical user interface the initial graphical representation of the generated specification rate by displaying multiple specification rates corresponding to each of the respective allowed response sets; and
    display in the graphical user interface the updated graphical representation of the updated specification rate by displaying multiple specification rates corresponding to each of the respective allowed response sets.

15. The computer-program product of claim 1, wherein the instructions are operable to cause the computing system to:
  further obtain an updated computing model; and
  display in the graphical user interface the updated graphical representation of the updated specification rate that accounts for the updated setting and the updated computing model.

16. The computer-program product of claim 1,
  wherein the instructions are operable to cause the computing system to obtain the specification by receiving a user indication of an upper and lower bound for at least one of the one or more output responses; and
  wherein the generated specification rate and the updated specification rate are each in-specification rates that indicate different portions of a given design space within the allowed response set defined by the specification.

17. The computer-program product of claim 1, wherein the instructions are operable to cause the computing system to:
  generate a distribution of one or more candidate options for the one or more input variables and corresponding output responses according to the at least one computing model; and
  receive the initial setting reducing the given set of the one or more sets by excluding, according to the one or more bounds, given candidate options in the distribution;
  receive the updated setting by:
    including excluded candidate options according to the initial setting; or
    excluding additional candidate options according to the initial setting.

18. The computer-program product of claim 1,
  wherein the one or more input variables comprise one or more factors for developing a batch of products within a development process;
  wherein the generated specification rate and the updated specification rate are each a ratio of the batch predicted to be within specification over a total of all products in the batch; and
  wherein the instructions are operable to cause the computing system to:
    display the initial graphical representation by displaying for each of the one or more factors a respective lower bound and a respective upper bound for candidate options for the one or more factors within the development process; and
    receive the updated setting by receiving a user indication to change the respective lower bound or the respective upper bound.

19. The computer-program product of claim 1, wherein the instructions are operable to cause the computing system to:
  display the initial graphical representation by:
    generating initial data points for each input variable of the one or more input variables across a range of candidate inputs as defined by the initial setting for one or more bounds;
    depicting in the initial graphical representation the generated specification rate indicating a predicted amount of the initial data points that would be in-specification; and
    depicting in the initial graphical representation other predicted specification rates corresponding to other unselected bound options;
  receive the updated setting based on the user indication to change the set bound of the one or more bounds to one of the other unselected bound options; and
  display the updated graphical representation by:
    obtaining updated data points for each input variable of the one or more input variables across a range of candidate inputs as defined by the updated setting for one or more bounds; and
    depicting in the updated graphical representation the updated specification rate indicating a predicted amount of the updated data points that would be in-specification.

20. A computer-implemented method comprising:
  obtaining at least one computing model configured to predict one or more output responses based on one or more input variables;
  obtaining a specification defining an allowed response set for the one or more output responses;
  receiving an initial setting for one or more bounds, wherein the initial setting defines one or more sets, and wherein each set of the one or more sets comprises one or more candidate options for a given input variable of the one or more input variables;
  generating an initial design space for the one or more input variables defined by the initial setting;
  displaying in a graphical user interface an initial graphical representation of a generated specification rate, wherein the generated specification rate indicates a portion of the initial design space predicted, according to the at least computing model, to generate a response within the allowed response set defined by the specification;
  receiving an updated setting based on a user indication to change a set bound of the one or more bounds in the graphical user interface such that a given set of the one or more sets comprises more or fewer candidate options than the initial setting;
  generating an updated design space for the one or more input variables defined by the updated setting; and
  displaying in the graphical user interface an updated graphical representation of an updated specification rate, wherein the updated specification rate indicates a portion of the updated design space predicted, according to the at least one computing model, to generate a response within the allowed response set defined by the specification.

21. The computer-implemented method of claim 20,
  wherein the displaying the initial graphical representation comprises displaying at least one graph representing a related group of predicted specification rates, wherein individual predicted specification rates in the related group of predicted specification rates is responsive to changes to a set bound of the one or more bounds to increase or decrease candidate options of a given set of the one or more sets; and
  wherein the displaying the updated graphical representation comprises:
    updating the at least one graph to account for the user indication; and
    representing on the updated graphical representation an intersection of the related group of predicted specification rates with the set bound.

22. The computer-implemented method of claim 20,
  wherein the computer-implemented method comprises generating predictions for candidate specification rates wherein the candidate specification rates each indicate a portion of a given design space predicted, according to the at least one computing model, to generate a response with the allowed response set defined by the specification;
wherein the displaying the initial graphical representation comprises:
   displaying at least one graph representing, for a given input variable of the one or more input variables, an association between the predictions for the candidate specification rates and a given bound for candidate options for the given input variable; and
   displaying a marker on the at least one graph for the given bound; and
wherein the user indication to change the set bound of the one or more bounds comprises moving the marker.

23. The computer-implemented method of claim 20,
wherein the computer-implemented method comprises generating predictions for candidate specification rates wherein the candidate specification rates each indicate a portion of a given design space predicted, according to the at least one computing model, to generate a response with the allowed response set defined by the specification;
wherein the displaying the initial graphical representation comprises displaying at least one graph representing, for a given input variable of the one or more input variables, an association between the predictions for the candidate specification rates and a given bound for candidate options for the given input variable; and
wherein when the given input variable comprises a categorical factor and the at least one graph shows multiple levels for candidate options for the categorical factor, the displaying at least one graph comprising displaying relative correlations for particular levels of the multiple levels based on a length of a categorical visual indicator at each of the levels in the at least one graph; and
wherein when the given input variable comprises a continuous factor and the at least one graph shows candidate options in one or more ranges, the displaying at least one graph comprising displaying relative correlations for particular options in the at least one graph based on a gradient of a continuous visual indicator within the one or more ranges.

24. The computer-implemented method of claim 20, wherein the receiving the updated setting based on the user indication indicating to change the set bound of the one or more bounds comprises changing in the graphical user interface one or more of:
   a graphical representation of a set bound of the one or more bounds;
   a graphical representation of the generated specification rate;
   a graphical representation of an individual setting corresponding to a given input variable of the one or more input variables; and
   a cumulative setting for the one or more input variables.

25. The computer-implemented method of claim 20,
wherein the method further comprises displaying one or more graphs indicating included and excluded candidate options for the one or more input variables; and
wherein included candidate options are used for deriving the updated graphical representation of the updated specification rate and excluded candidate options are not used for deriving the updated graphical representation of the updated specification rate.

26. The computer-implemented method of claim 20,
wherein displaying the initial graphical representation of the generated specification rate comprises displaying a table indicating the generated specification rate; and
wherein displaying the updated graphical representation of the updated specification rate comprises updating the table.

27. The computer-implemented method of claim 20, wherein the receiving the updated setting comprises:
   receiving the user indication to change the set bound of the one or more bounds by changing the generated specification rate autonomously from user selection of a particular bound for the one or more input variables;
   generating a computer selection of a selected bound for a given input variable of the one or more input variables; and
   determining the updated setting based on the computer selection.

28. The computer-implemented method of claim 20,
wherein the obtaining the at least one computing model comprises obtaining a predictive model predicting the one or more output responses according to settings for multiple different input variables of the one or more input variables, wherein the multiple different input variables comprise three or more input variables;
wherein the displaying in the graphical user interface the initial graphical representation comprises displaying, in proximity to the specification rate, bounds for each of the multiple different input variables; and
wherein the specification rate indicates a cumulative likelihood of being within the allowed response set accounting for the settings for the multiple different input variables of the one or more input variables.

29. The computer-implemented method of claim 20,
wherein the obtaining the at least one computing model comprises obtaining multiple predictive models, or a multi-output model, for multiple types of output response for the one or more output responses; and
wherein the obtaining the specification comprises obtaining a cumulative specification defining an allowed response set for each of the multiple types of output responses.

30. A computing device comprising processor and memory, the memory containing instructions executable by the processor wherein the computing device is configured to:
   obtain at least one computing model configured to predict one or more output responses based on one or more input variables;
   obtain a specification defining an allowed response set for the one or more output responses;
   receive an initial setting for one or more bounds, wherein the initial setting defines one or more sets, and wherein each set of the one or more sets comprises one or more candidate options for a given input variable of the one or more input variables;
   generate an initial design space for the one or more input variables defined by the initial setting;
   display in a graphical user interface an initial graphical representation of a generated specification rate, wherein the generated specification rate indicates a portion of the initial design space predicted, according to the at least one computing model, to generate a response within the allowed response set defined by the specification;
   receive an updated setting based on a user indication to change a set bound of the one or more bounds in the graphical user interface such that a given set of the one or more sets comprises more or fewer candidate options than the initial setting;

generate an updated design space for the one or more input variables defined by the updated setting; and display in the graphical user interface an updated graphical representation of an updated specification rate, wherein the updated specification rate indicates a portion of the updated design space predicted, according to the at least one computing model, to generate a response within the allowed response set defined by the specification.

\* \* \* \* \*

UNITED STATES PATENT AND TRADEMARK OFFICE
CERTIFICATE OF CORRECTION

| | | |
|---|---|---|
| PATENT NO. | : 11,586,675 B1 | Page 1 of 20 |
| APPLICATION NO. | : 17/860655 | |
| DATED | : February 21, 2023 | |
| INVENTOR(S) | : John Sall | |

It is certified that error appears in the above-identified patent and that said Letters Patent is hereby corrected as shown below:

On the Title Page

Please delete title page and substitute therefor with the attached title page.

In the Drawings

Delete drawing sheets 1-16 substitute therefor the replacement sheets 1-18 as shown on the attached pages.

Signed and Sealed this
Twenty-fourth Day of December, 2024

Derrick Brent
*Acting Director of the United States Patent and Trademark Office*

(12) United States Patent
Sall

(10) Patent No.: US 11,586,675 B1
(45) Date of Patent: Feb. 21, 2023

(54) INTERACTIVE GRAPHICAL USER INTERFACE FOR SPECIFICATION RATE SETTINGS AND PREDICTIONS

(71) Applicant: JMP Statistical Discovery LLC, Cary, NC (US)

(72) Inventor: John Sall, Cary, NC (US)

(73) Assignee: JMP Statistical Discovery LLC, Cary, NC (US)

( * ) Notice: Subject to any disclaimer, the term of this patent is extended or adjusted under 35 U.S.C. 154(b) by 0 days.

(21) Appl. No.: 17/860,655

(22) Filed: Jul. 8, 2022

Related U.S. Application Data

(60) Provisional application No. 63/321,810, filed on Mar. 21, 2022, provisional application No. 63/229,033, filed on Aug. 3, 2021.

(51) Int. Cl.
*G06F 16/901* (2019.01)
*G06F 40/18* (2020.01)
*G06F 3/04847* (2022.01)

(52) U.S. Cl.
CPC ...... *G06F 16/9024* (2019.01); *G06F 3/04847* (2013.01); *G06F 40/18* (2020.01)

(58) Field of Classification Search
None
See application file for complete search history.

(56) References Cited

U.S. PATENT DOCUMENTS

| | | | |
|---|---|---|---|
| 9,378,197 B1* | 6/2016 | Ghanem | G06F 40/18 |
| 10,996,662 B2* | 5/2021 | Imanari | G05B 23/0218 |
| 11,328,106 B2* | 5/2022 | Lekivetz | G06F 30/27 |
| 2003/0061212 A1* | 3/2003 | Smith | G06Q 10/06 |
| 2009/0112532 A1* | 4/2009 | Foslien | G06F 17/18 703/2 |
| 2013/0218909 A1* | 8/2013 | Chu | G06F 16/11 707/752 |
| 2020/0233542 A1* | 7/2020 | Breedvelt-Schouten | G06F 3/0484 |

(Continued)

OTHER PUBLICATIONS

SAS simulation studio 15.1 Users Guide, Nov. 2018, SAS Institute Inc (Year: 2018).*

(Continued)

*Primary Examiner* — Howard Cortes
(74) *Attorney, Agent, or Firm* — Coats & Bennett, PLLC

(57) ABSTRACT

A computing system obtains computer model(s) configured to predict response(s) based on variable(s). The system obtains a specification defining an allowed response set for the response(s) and receives an initial setting for bound(s). The system generates an initial design space for the variable(s) defined by the initial setting. The system displays in a graphical user interface (GUI) an initial representation of a specification rate. The specification rate indicates a portion of the initial design space predicted to generate a response within the allowed response set defined by the specification. The system receives an updated setting. The system generates an updated design space for the variable(s) defined by the updated setting. The system displays in the GUI an updated representation of an updated specification rate. The updated specification rate indicates a portion of the updated design space predicted to generate a response within the allowed response set defined by the specification.

30 Claims, 18 Drawing Sheets

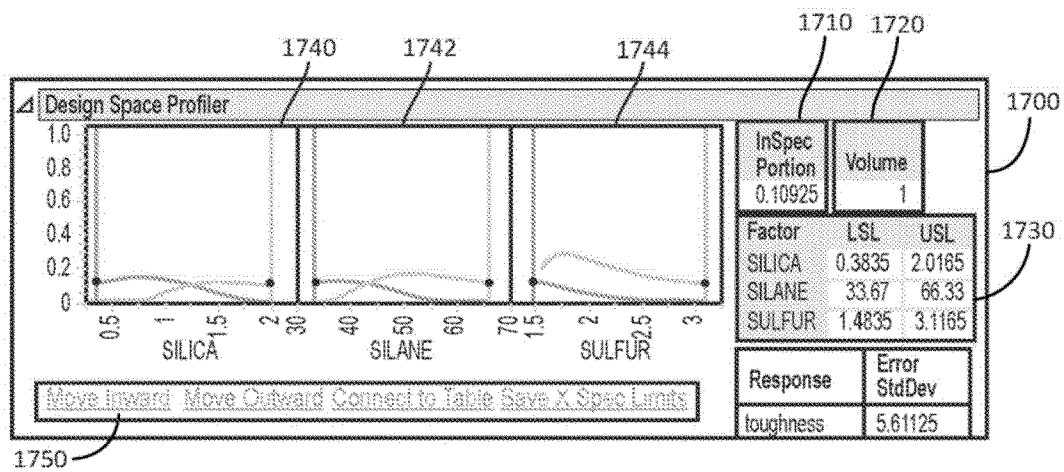

| | SILICA | SILANE | SULFUR | toughness |
|---|---|---|---|---|
| 1 | 1.7063449433 | 52.72779651 | 3.050412124 | 186.51804028 |
| 2 | 1.7954746239 | 41.207450575 | 2.178918065 | 128.63542959 |
| 3 | 1.9916958403 | 57.175243741 | 2.4703506908 | 187.35309704 |
| 4 | 1.3621444357 | 38.218025269 | 2.1215552596 | 114.01777872 |

FIG. 8

| Specification Rate 2510 | Volume 2512 | Auto-tune Rate 2514 |
|---|---|---|
| 78.852% | 39.986% | 80% |

| Lock 2520 | Factor 2522 | Lower Bound 2524 | Upper Bound 2526 |
|---|---|---|---|
|  | Butanol | 0 | 10 |
|  | Ethanol | 0 | 10 |
| X | Methanol | 6 | 10 |
|  | Propanol | 0 | 10 |
|  | Time | 1 | 2 |

2550

FIG. 13B